US009325770B2

(12) United States Patent
Cho

(10) Patent No.: US 9,325,770 B2
(45) Date of Patent: Apr. 26, 2016

(54) MOBILE TERMINAL AND METHOD OF CONTROLLING THE SAME

(71) Applicant: LG ELECTRONICS INC., Seoul (KR)

(72) Inventor: Kyungmin Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 13/722,656

(22) Filed: Dec. 20, 2012

(65) Prior Publication Data

US 2013/0182138 A1      Jul. 18, 2013

(30) Foreign Application Priority Data

Dec. 21, 2011   (KR) .................. 10-2011-0139270

(51) Int. Cl.
*H04N 5/232*       (2006.01)
*H04L 29/08*       (2006.01)
(Continued)

(52) U.S. Cl.
CPC .............. *H04L 67/02* (2013.01); *G06F 3/0482* (2013.01); *G06F 9/4445* (2013.01); *H04L 67/125* (2013.01); *H04L 67/327* (2013.01); *H04M 1/72533* (2013.01); *H04N 1/0044* (2013.01); *H04N 1/00183* (2013.01); *H04N 1/00244* (2013.01); *H04N 1/00307* (2013.01); *H04N 1/00411* (2013.01); *H04N 1/00442* (2013.01); *H04N 1/00482* (2013.01); *H04N 1/00973* (2013.01); *H04N 1/32106* (2013.01); *H04N 5/232* (2013.01); *H04N 5/23206* (2013.01); *H04N 7/188* (2013.01); *H04W 4/022* (2013.01); *H04N 2007/145* (2013.01);

(Continued)

(58) Field of Classification Search
CPC ......................... H04N 5/232; H04N 5/23206
USPC ........................................... 348/211.3
See application file for complete search history.

(56) References Cited

U.S. PATENT DOCUMENTS

2001/0032335 A1*  10/2001  Jones ............... H04L 29/06
                                                 725/105
2001/0045983 A1*  11/2001  Okazaki .......... H04L 63/101
                                                348/211.99

(Continued)

FOREIGN PATENT DOCUMENTS

CN      2596680      12/2003
CN      1525668       9/2004

(Continued)

OTHER PUBLICATIONS

European Patent Office Application Serial No. 12008414.0, Search Report dated Apr. 5, 2013, 7 pages.

(Continued)

*Primary Examiner* — Roberto Velez
*Assistant Examiner* — Abdelaaziz Tissire
(74) *Attorney, Agent, or Firm* — Lee, Hong, Degerman, Kang & Waimey; Jonathan Kang; Harry Lee

(57) ABSTRACT

A method of controlling a mobile terminal to perform remote capture is provided. The method of controlling a mobile terminal includes: setting remote capture conditions; transmitting the remote capture conditions with a remote capture request signal to one or more remote terminals; and receiving images captured by one or more remote terminals that capture predetermined images according to the remote capture conditions from among the one or more remote terminals.

20 Claims, 41 Drawing Sheets

(51) Int. Cl.
 G06F 9/44 (2006.01)
 G06F 3/0482 (2013.01)
 H04N 7/18 (2006.01)
 H04W 4/02 (2009.01)
 H04N 1/00 (2006.01)
 H04N 1/32 (2006.01)
 H04M 1/725 (2006.01)
 H04W 4/20 (2009.01)
 H04N 7/14 (2006.01)
 H04N 101/00 (2006.01)

(52) U.S. Cl.
 CPC ... *H04N 2101/00* (2013.01); *H04N 2201/0084* (2013.01); *H04N 2201/3205* (2013.01); *H04N 2201/3222* (2013.01); *H04N 2201/3273* (2013.01); *H04N 2201/3278* (2013.01); *H04W 4/206* (2013.01)

(56) References Cited

U.S. PATENT DOCUMENTS

| | | | | |
|---|---|---|---|---|
| 2002/0067412 | A1* | 6/2002 | Kawai | H04N 7/181 348/211.99 |
| 2003/0202101 | A1* | 10/2003 | Monroe | G08B 13/19689 348/156 |
| 2004/0183915 | A1* | 9/2004 | Gotohda | H04N 5/23206 348/207.11 |
| 2004/0223057 | A1* | 11/2004 | Oura | H04N 1/00204 348/207.1 |
| 2008/0129821 | A1 | 6/2008 | Howarter et al. | |
| 2008/0253302 | A1* | 10/2008 | Nago | H04W 8/005 370/254 |
| 2008/0297608 | A1* | 12/2008 | Border | H04N 1/00204 348/207.11 |
| 2011/0273570 | A1* | 11/2011 | Sakaki | H04N 5/23203 348/207.11 |
| 2012/0050549 | A1* | 3/2012 | Maekawa | H04N 1/00153 348/207.1 |
| 2014/0240575 | A1* | 8/2014 | Kaneda | H04N 5/23293 348/333.01 |

FOREIGN PATENT DOCUMENTS

| | | |
|---|---|---|
| CN | 101163307 | 4/2008 |
| CN | 101682749 | 3/2010 |
| CN | 101815173 | 8/2010 |
| GB | 2416897 | 2/2006 |
| WO | 03009601 | 1/2003 |

OTHER PUBLICATIONS

The State Intellectual Property Office of the People's Republic of China Application Serial No. 201210558747.X, Office Action dated Jun. 1, 2015, 13 pages.

* cited by examiner (P11 long touch)

Fig. 34E
 Hui Sook Yun was tagged in JeeYeon Jae Lee's photo. -with Kyungmn Cho ard Moonhee Choi at Decube city.
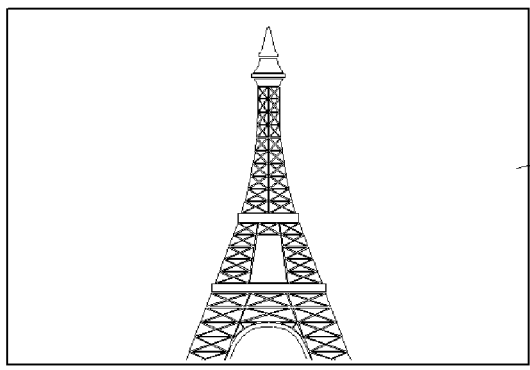 —Pr
kk, we are four
 February 14 at 11:52 pm

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2011-0139270, filed on Dec. 21, 2011, the contents of which are hereby incorporated by reference herein in its entirety.

BACKGROUND

1. Field

The present invention relates to a mobile terminal, a server, a method of controlling the mobile terminal and a method controlling the server.

2. Related Art

With the recent remarkable development of software and hardware, mobile terminals can provide various functions to users.

Accordingly, there is an increasing need of developing and propagating various user interfaces by which a user can control a mobile terminal providing a variety of complicated functions easily and efficiently.

Various functions of a mobile terminal can be provided in the form of applications. Among these applications, a camera application can capture various pictures.

Meanwhile, a social network service (SNS), which is a web based service, can provide community among users through an E-mail or instance messenger service.

SUMMARY

An object of the present invention is to provide a mobile terminal, a server, and a method of controlling the same to share a predetermined image through a network generated between users located in different spaces in real time by extending functions of a camera application.

An object of the present invention is to provide a mobile terminal, a server, and a method of controlling the same to efficiently share an image captured in real time through attributes of a social network generated and ended in real time.

According to an aspect of the present invention, a method of controlling a mobile terminal includes: setting remote capture conditions; transmitting the remote capture conditions with a remote capture request signal to one or more remote terminals; and receiving images captured by one or more remote terminals that capture predetermined images according to the remote capture conditions from among the one or more remote terminals.

According to another aspect of the present invention, a method of controlling a server includes: receiving a remote capture request signal including remote capture conditions from a mobile terminal; searching for one or more remote terminals capable of capturing predetermined images according to the remote capture conditions; transmitting the remote capture request signal including the remote capture conditions to the searched one or more remote terminals; receiving an image captured by one or more remote terminals from among the one or more remote terminals; and transmitting the image received from the one or more remote terminals to the mobile terminal.

According to another aspect of the present invention, a mobile terminal includes: a communication unit; a display unit; and a controller configured to set remote capture conditions, to transmit a remote capture request signal including the remote capture conditions to one or more remote terminals through the communication unit, and to receive capture images from the one or more remote terminals.

According to another aspect of the present invention, a server includes: a communication; and a controller configured to receive a remote capture request signal including remote capture conditions from a mobile terminal through the communication unit, to search for one or more remote terminals that capture predetermined images according to the remote capture conditions, to request remote capture to the searched one or more remote terminals according to the remote capture conditions, to receive predetermined images captured by the remote terminals, and to transmit the predetermined images to the mobile terminal.

According to another aspect of the present invention, a mobile terminal includes: at least one processor; a memory; and at least one program, wherein the at least one program is stored in the memory and executed by the at least one processor, wherein the at least one program sets remote capture conditions, transmits the remote capture conditions with a remote capture request signal to one or more remote terminals, and includes a command for receiving an image captured by one or more remote terminals capable of capturing predetermined images according to the remote capture conditions from among the one or more remote terminals.

Details of embodiments are included in the following detailed description and drawings.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal according to embodiments of the present invention will be described below in more detail with reference to the accompanying drawings. In the following description, suffixes "module" and "unit" are given to components of the mobile terminal in consideration of only facilitation of description and do not have meanings or functions discriminated from each other.

The electronic device 100 and the external electronic devices 10 may be fixed terminals or mobile terminals. For example, any of the electronic device 100 and the external electronic devices 10 can comprise a portable phone, a smart phone, a personal computer, a laptop computer, a terminal for digital broadcasting, a Personal Digital Assistants (PDA), a Portable Multimedia Player (PMP), a navigator, or a Mobile Internet Device (MID).

Figure 1:
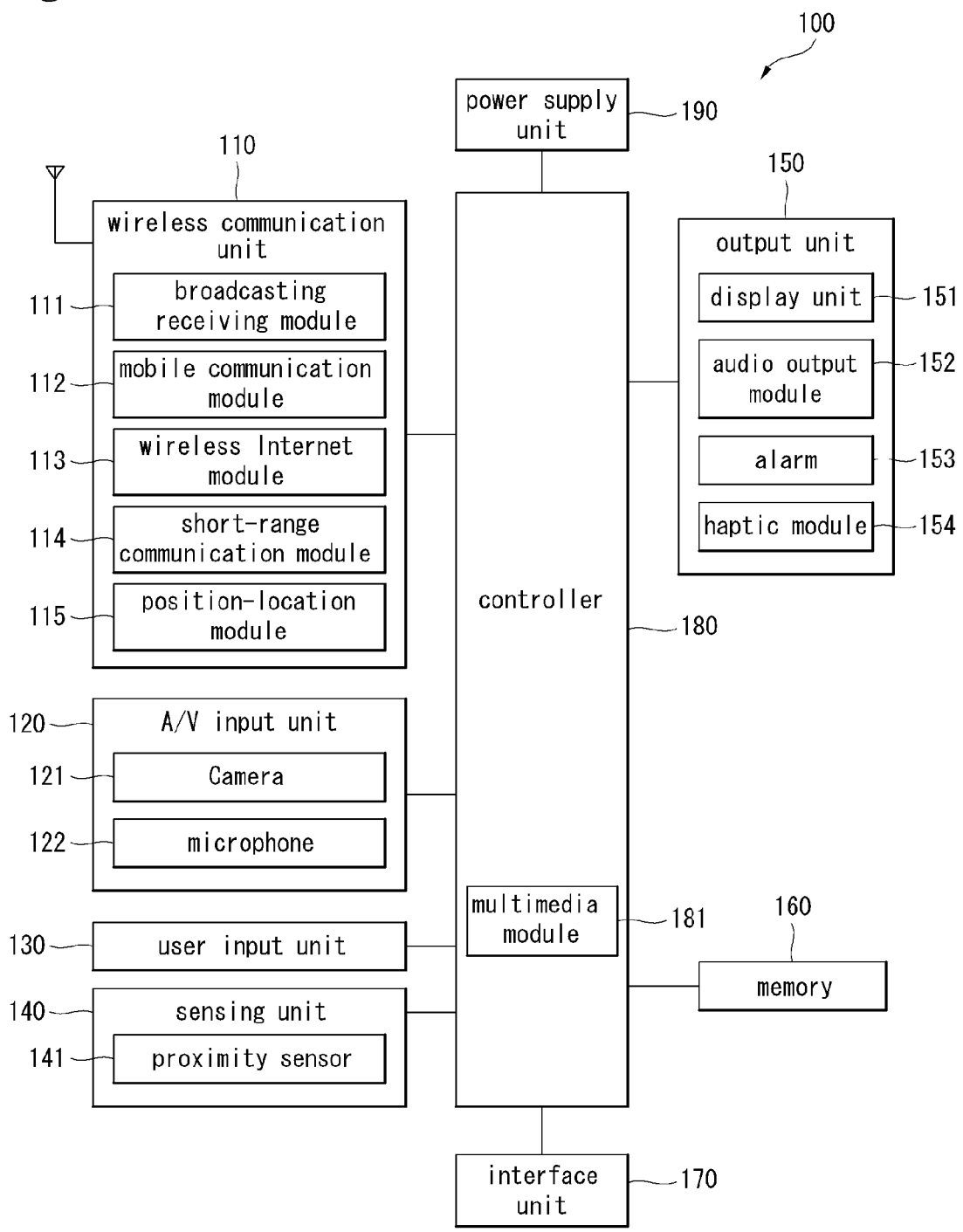
FIG. 1 is a block diagram of a mobile terminal according to an embodiment of the present invention.

Referring to FIG. 1, a mobile terminal 100, as an example of the electronic device 100 according to embodiments this invention, is described in detail with reference to the accompanying drawings. FIG. 1 is a block diagram of the mobile terminal according to an embodiment of this invention. As used herein, the suffixes 'module' and 'unit' are used for elements in order to facilitate the disclosure only. Therefore, significant meanings or roles are not given to the suffixes themselves and it is understood that the 'module' and 'unit' can be used together or interchangeably.

Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Although FIG. 1 shows the mobile terminal 100 having various components, it is understood that implementing all of the illustrated components is not a requirement. More or fewer components may alternatively be implemented.

The wireless communication unit 110 includes one or more components that permit wireless communication between the mobile terminal 100 and a wireless communication system or a network within which the mobile terminal 100 is located. For example, the wireless communication unit 110 includes a broadcast receiving module 111, a mobile communication module 112, a wireless Internet module 113, a short-range communication module 114 and a position-location module 115. For non-mobile terminals, the wireless communication unit 110 may be replaced with a wired communication unit. The wireless communication unit 110 and the wired communication unit may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The broadcast associated information may be information about a broadcast channel, a broadcast program, or a broadcast service provider. The broadcast associated information may even be provided over a mobile communication network. In the latter case, the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. This wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access). The wireless Internet module 113 may be replaced with a wired Internet module in non-mobile terminals. The wireless Internet module 113 and the wired Internet module may be commonly referred to as an Internet module.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The position-location module 115 identifies or otherwise obtains a location of the mobile terminal 100. The position-location module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

As a typical example of the GNSS, the position-location module 115 is a GPS module. The position-location module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also used. The position-location module 115 continues to calculate a current position in real time and to calculate velocity information based on the position information.

With continued reference to FIG. 1, the audio/video (A/V) input unit 120 may be configured to provide audio or video signal input to the mobile terminal 100. The A/V input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121, if appropriate.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the A/V input unit 120, may include a noise removing algorithm to remove noise generated in the course of receiving the external audio signal.

The user input unit 130 generates input data in response to user manipulation of an associated input device or devices. Examples of such devices include a keypad, a dome switch, a touchpad (e.g., static pressure/capacitance), a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense presence or absence of power provided by the power supply unit 190 or the presence or absence of a coupling or other connection between the interface unit 170 and an external device.

The output unit 150 generates output relevant to the senses of sight, hearing and touch. The output unit 150 may include a display unit 151, an audio output module 152, an alarm 153, and a haptic module 154.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays.

The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller (not shown). The touch controller processes the signal(s) and then transfers corresponding data to the controller 180. The controller 180 may determine, therefore, which portion of the display unit 151 is touched.

With continued reference to FIG. 1, a proximity sensor 141 can be provided within the mobile terminal 100 enclosed by the touch screen or around the touch screen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen (touch sensor) may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern (e.g., proximity touch distance, proximity touch duration, proximity touch position, proximity touch shift state). Information corresponding to the detected proximity touch action and/or the detected proximity touch pattern may be displayed on the touch screen.

The controller 180 (FIG. 1) recognizes the proximity touch as one of various input signals according to proximity depth and position of the pointer. The controller 180 performs various operation controls according to various input signals.

Referring again to FIG. 1, the audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include, for example, a receiver, a speaker or a buzzer.

The alarm 153 outputs a signal for announcing an occurrence of a particular event associated with the mobile terminal 100. Typical events include a call signal reception, a message reception, a key signal input and a touch input. The alarm 153 outputs a signal for announcing the event occurrence via vibration as well as a video signal or an audio signal. The video signal is output via the display unit 151 and the audio signal is output via the audio output module 152. Hence, at least the display unit 151 or the audio output module 152 can be regarded as part of the alarm 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The memory 160 is configured to store programs for operation of the controller 180. The memory 160 may temporarily store input/output data (e.g., phonebook, message, still picture, moving picture, etc.). The memory 160 may store data of vibration and sound in various patterns output when the touch screen receives a touch input.

The memory 160 may include, for example, a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk or an optical disk. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100. The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may work as a signal for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognizing processing for recognizing a handwriting input performed on the touch screen as a character and/or recognizing a picture drawing input performed on the touch screen as characters or images.

The power supply unit 190 provides power required by the various components for the mobile terminal 100. The power may be internal power, external power, or combinations thereof.

Embodiments of the present invention described in the following description may be implemented within a recording medium that can be read by a computer or a computer-like device using software, hardware or combinations thereof. For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

In is assumed that the display unit 151 is a touchscreen 151 for convenience of description. As described above, the touchscreen 151 can execute both an information display function and an information input function. However, the present invention is not limited thereto. In addition, touch mentioned in the specification may include contact touch and proximity touch.

Figure 2:
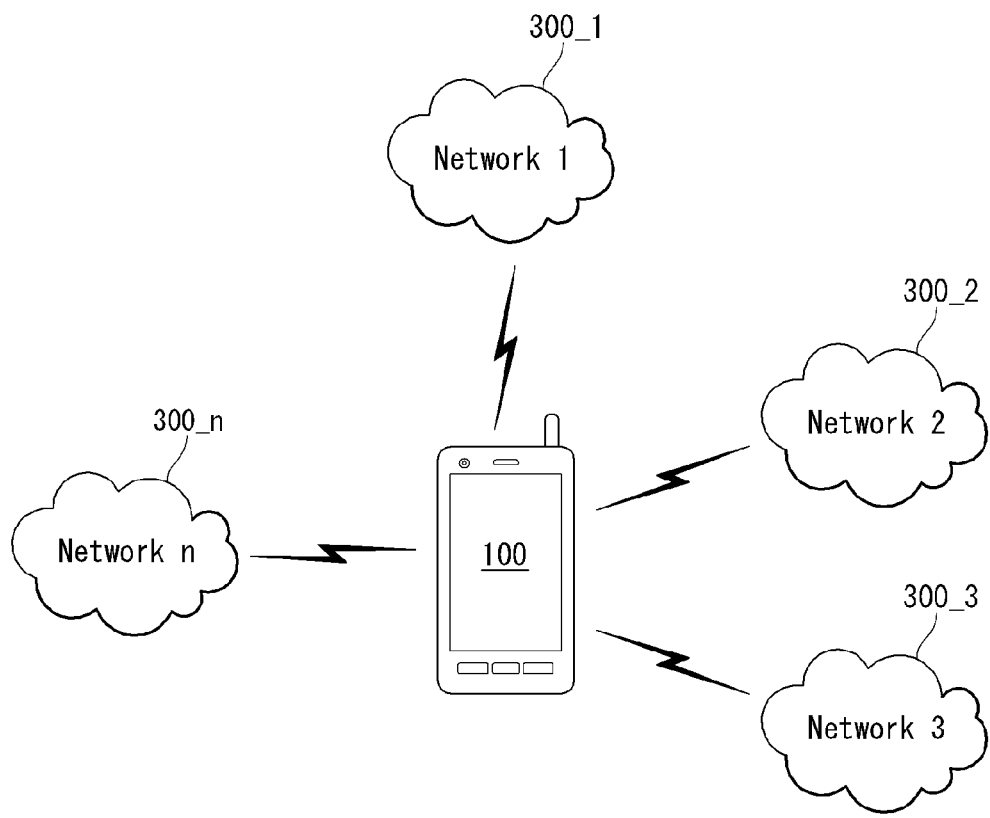
FIG. 2 illustrates a configuration of a remote photography system using the mobile terminal according to an embodiment of the present invention.

FIG. 2 illustrates a configuration of a remote photography system using a mobile terminal according to an embodiment of the present invention.

The remote photography system using a mobile terminal according to an embodiment of the present invention may include the mobile terminal 100 and one or more networks 300_1, 300_2, 300_3, . . . , 300_n generated between the mobile terminal 100 and remote terminals (not shown).

The mobile terminal 100 has been described above with reference to FIG. 1.

The mobile terminal 100 may generate a network with a remote terminal (not shown).

The network may include a plurality of social networks having different attributes. Attributes of social networks implemented according to embodiments of the present invention may be determined at the request of a user.

Attributes of a network may include user profile information or location information of a user that generates the network.

For example, the user profile information may be personal information of the user, that is, a static condition, such as the age, gender, hobby, religion, favorite music, and favorite food of the user.

Accordingly, a remote capture requester can set a remote capture condition and, when the remote capture condition corresponds to specific user profile information, configure a network with a user corresponding to the user profile information.

Attributes of a social network may include information about a location where a network user is positioned. For example, if the network user is located in a specific area or within a predetermined radius from the specific area, the attributes of the social network may include location information of the network user.

Accordingly, when a user requests a network configured with users located in a specific area or adjacent to the specific area to be generated, the generated network may include location information as an attribute.

In the embodiments of the present invention, when a predetermined network is generated, a user of the network performs remote capture and a captured image is received, the network may be automatically ended.

For example, a location based network can be generated when a remote capture requester requests photographing of a specific area. When an image captured by a receiver who is included in the network and performs remote capture is received, the location based network may be automatically ended.

An example of generating a predetermined network through the mobile terminal at the request of a user and ending the network when a predetermined purpose is accomplished through the network through the embodiment of the invention has been described above.

However, the present invention is not limited thereto. For example, when remote capture is requested according to the above-described embodiment of the invention, remote capture may be requested without generating a network. For example, when at least one of receivers corresponding a phone book stored in the mobile terminal is requested to perform remote capture, it is not necessary to generate a network because a remote capture request signal receiver is specified in advance.

A description will be given of a procedure of generating a network between the mobile terminal and another terminal through a predetermined external server according to an embodiment of the present invention.

Figure 3:
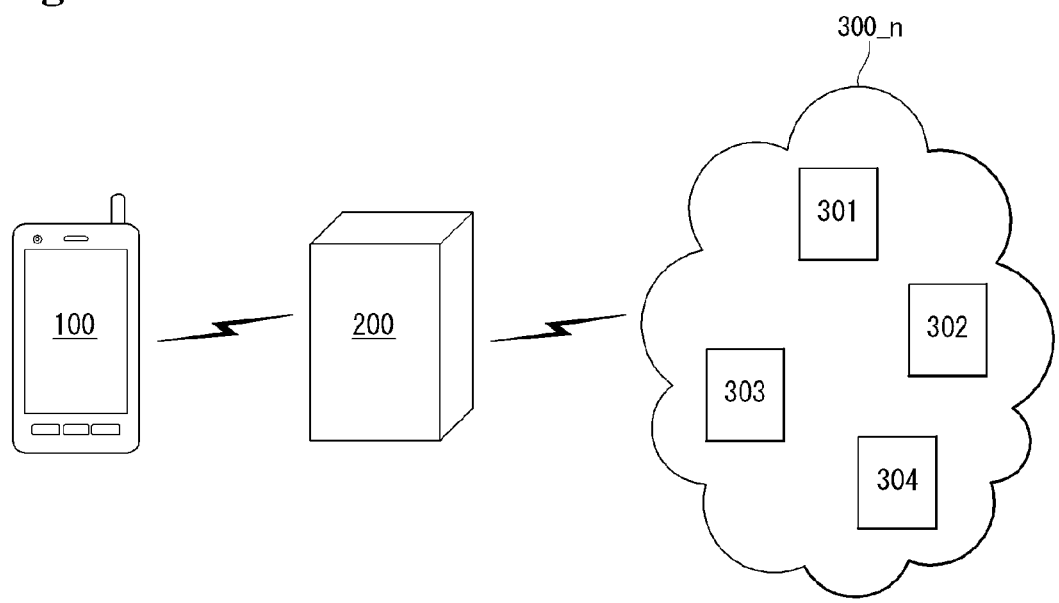
FIG. 3 illustrates a configuration of a remote photography system using the mobile terminal according to another embodiment of the present invention.

FIG. 3 illustrates a configuration of a remote photography system using the mobile terminal according to another embodiment of the present invention.

Referring to FIG. 3, the remote photography system using the mobile terminal according to the present embodiment of the invention may include the mobile terminal 100, a server 200 and one or more remote terminals 301, 302, 303 and 304.

The mobile terminal 100 may transmit a remote capture request to the server 200. The remote capture request may include at least one remote capture condition.

Upon reception of the remote capture request from the mobile terminal 100, the server 200 may search for one or more remote terminals that satisfy the remote capture condition.

The server 200 may include a user DB (not shown) storing information about users who subscribe and register in a remote capture service described in the present invention and search the user DB for one or more users that satisfy the remote capture condition.

The server 200 may transmit the remote capture request received from the mobile terminal 100 to the searched remote terminals.

Here, the server 200 may configure a network with the searched remote terminals and the mobile terminal that requests remote capture. That is, referring to FIG. 3, the server 200 can configure a network with the mobile terminal 100 and the remote terminals 301, 302, 303 and 304.

Upon configuration of the network, the server 200 may receive images captured by the remote terminals 301, 302, 303 and 304 and transmit the received images to the mobile terminal 100.

The remote photography system has been roughly described with reference to FIGS. 2 and 3. The mobile terminal and operations of the mobile terminal and the server according to the present invention will now be described in more detail with reference to FIGS. 4 and 5.

Figure 4:
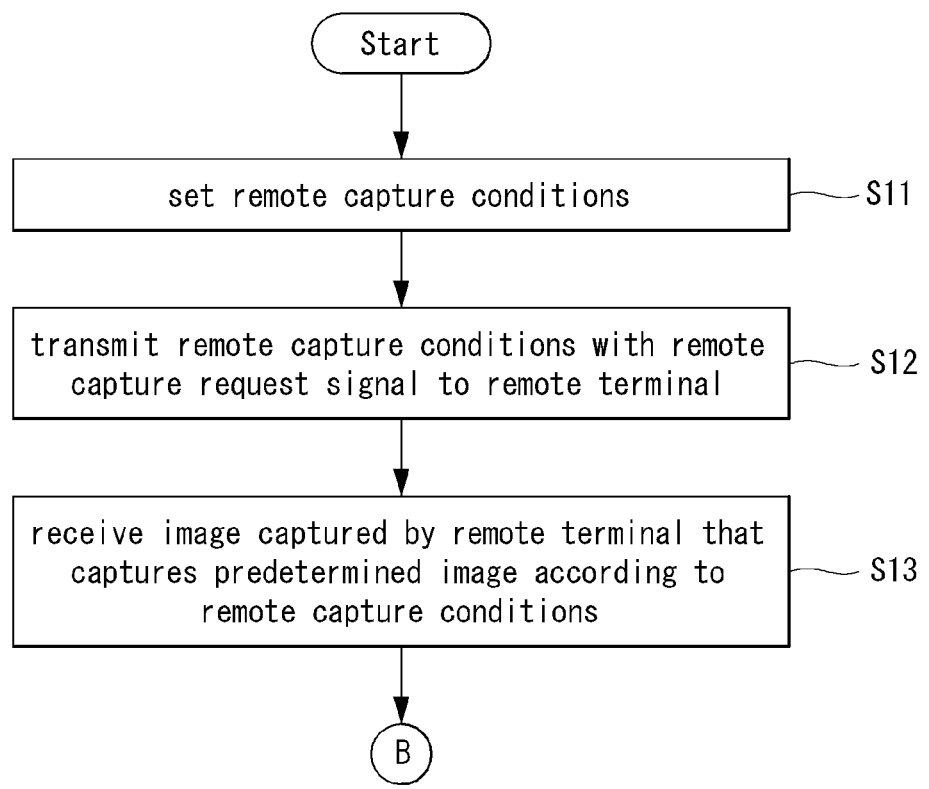
FIG. 4 is a flowchart illustrating a method of controlling a mobile terminal according to embodiments of the present invention.

FIG. 4 is a flowchart illustrating a method of controlling a mobile terminal according to embodiments of the present invention.

Figure 9:
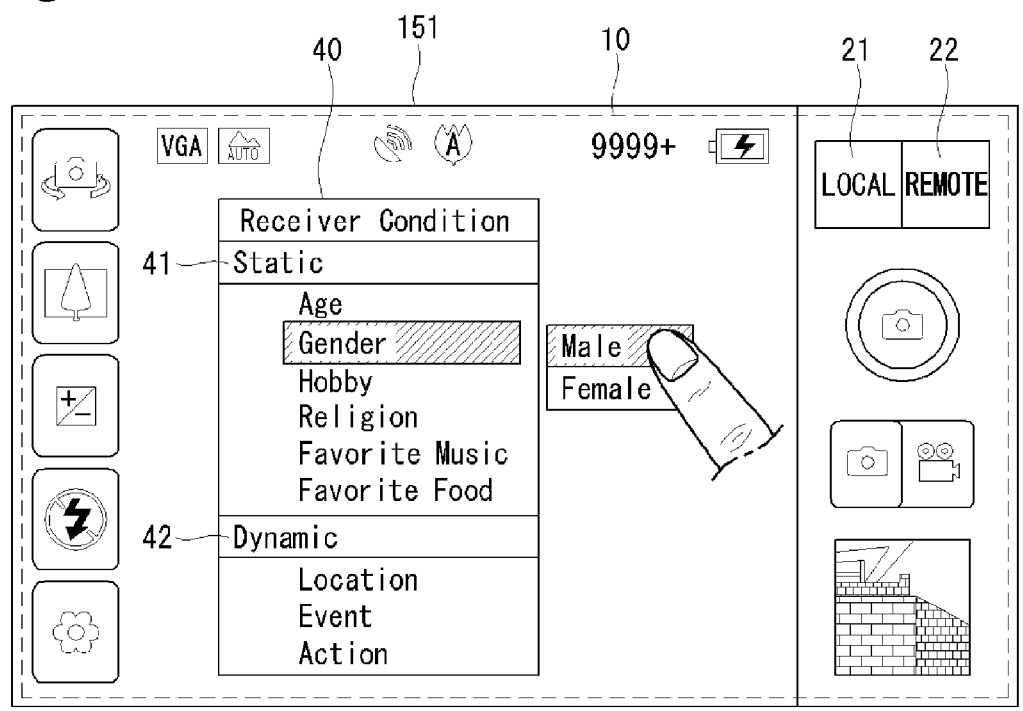
Figure 10:
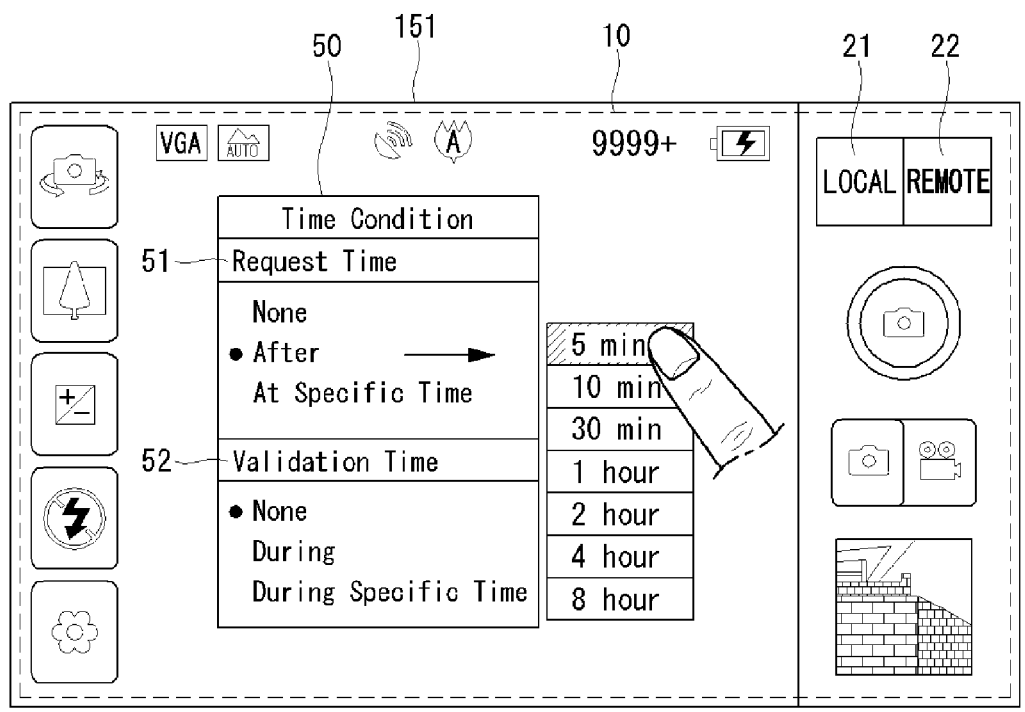
Figure 11:
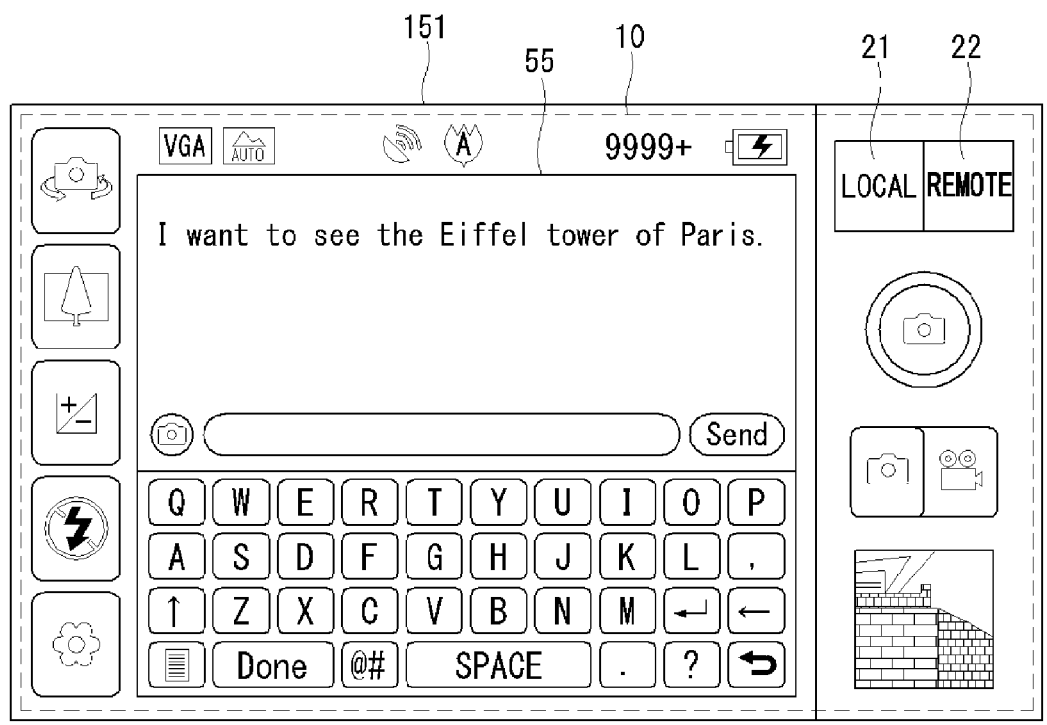

Referring to FIG. 4, the mobile terminal 100 may set remote capture conditions. The remote capture conditions may include a condition set by a user who requests image capture. The remote capture conditions may be set by the user of the mobile terminal 100 or automatically set by a predetermined standard. In addition, a remote terminal that will perform remote capture may be determined depending on the remote capture conditions. The remote capture conditions will be described below in detail with reference to related drawings (FIGS. 9 to 11).

The controller 180 may transmit the remote capture conditions with a remote capture request signal to a remote terminal (S12).

The controller 180 may receive an image captured by the remote terminal that will capture a predetermined image according to the remote capture conditions (S13).

Accordingly, the mobile terminal 100 can conveniently acquire a desired image through a physically remotely located remote terminal.

Figure 5:
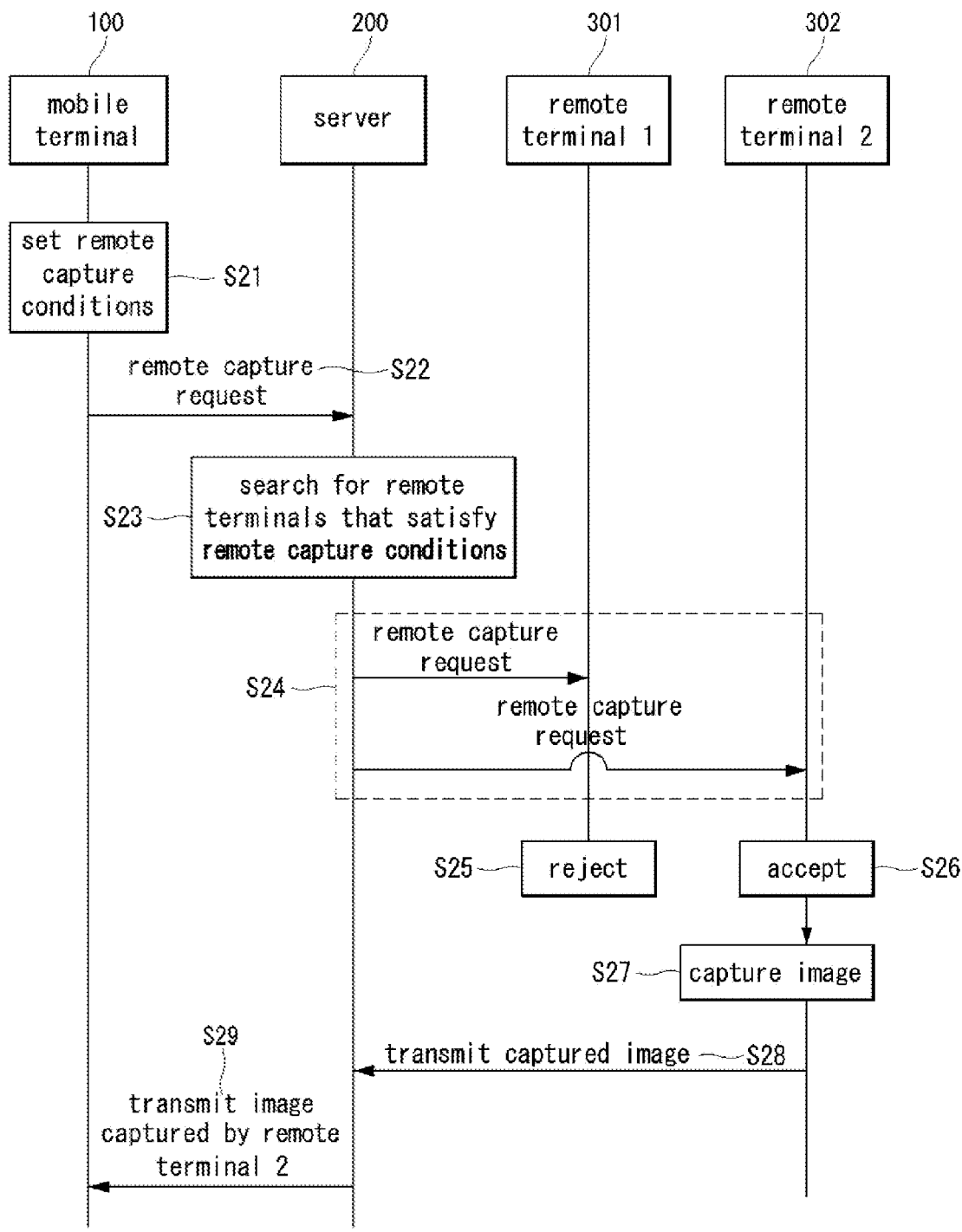
FIG. 5 is a flowchart illustrating a remote capture method using the mobile terminal that implements the system shown in FIG. 3 according to an embodiment of the present invention.

FIG. 5 is a flowchart illustrating a remote capture method using the mobile terminal according to an embodiment of the present invention, which is implemented through the remote photography system shown in FIG. 3.

The remote capture service according to an embodiment of the present invention may be implemented through various applications included in the mobile terminal. For example, the remote capture service can be implemented through a camera application, SNS application, map application, etc. of the mobile terminal. FIG. 4 illustrates an example of providing the remote capture service through the camera application.

Referring to FIG. 5, the mobile terminal 100 may enter a remote capture mode by driving the camera (121 of FIG. 1).

The controller 180 of the mobile terminal 100 may drive the camera by executing the camera application. When the camera operates, the mobile terminal 100 may operate in an image capture mode in which the mobile terminal 100 can capture an image through the camera or in the remote capture mode in which the mobile terminal 100 can request a remote terminal to perform remote capture.

In the image capture mode, the mobile terminal 100 may photograph a front or rear view using the camera (121 of FIG. 1) and store photographed images in the memory 160.

In the remote capture mode, the mobile terminal 100 may transmit a remote capture request signal including remote capture conditions to a predetermined remote terminal, receive an image captured by the remote terminal and store the received image in the memory 160.

While the remote capture request signal may be directly transmitted to the remote terminal in the remote capture mode, the remote capture request signal may be transmitted through the server 200 between the mobile terminal 100 and the remote terminal.

Specifically, the mobile terminal 100 can transmit the remote capture request signal to the server 200, and the server 200 can search for one or more remote terminals capable of capturing images, which satisfy the remote capture conditions, and transmit the remote capture request signal to the searched remote terminals.

Operations of implementing the remote capture service through the server 200 are described with reference to FIG. 5.

The mobile terminal 100 sets the remote capture conditions (S21) and transmits the remote capture request signal including the remote capture conditions to the server 200 (S22).

The server 200 may search for one or more remote terminals that meet the remote capture conditions (S23). For example, when the remote capture conditions include specific location information, the server 200 can search for remote terminals located in a specific area corresponding to the specific location information or located adjacent to the specific area.

The server 200 may transmit the remote capture request signal to the searched one or more remote terminals (S24). For example, the server 200 can transmit the remote capture request signal to first and second remote terminals 301 and 302.

Upon reception of the remote capture request signal, the first and second remote terminals 301 and 302 may determine whether to accept the remote capture request. FIG. 5 shows a case in which the first remote terminal 301 rejects the remote capture request (S25) whereas the second remote terminal 302 accepts the remote capture request (S26).

The server 200 may configure a predetermined network between the mobile terminal 100 and the searched remote terminals 301 and 302.

The network may be a social network. The social network may be a network configured with terminals that meet the remote capture conditions set by the mobile terminal 100. Here, if the first remote terminal 301 does not accept the remote capture request of the mobile terminal 100 although it has received the remote capture request signal, the server 200 may not configure the network between the mobile terminal 100 and the first remote terminal 301 or disconnect a network previously established therebetween.

When the second remote terminal 302 accepts the remote capture request of the mobile terminal 200, the second remote terminal 302 may capture a predetermined image according to the remote capture conditions (S27).

The second remote terminal 302 may transmit captured image data to the server 200 (S28) and the server 200 may receive the image data from the second remote terminal 302 and transmit the received image data to the mobile terminal 100 (S29).

The mobile terminal 100 may transmit an appropriate feedback signal upon reception of the image captured by the second remote terminal 302.

The feedback signal may be transmitted to the second remote terminal 302 through the server 200. The server 200 may end the network generated between the mobile terminal 100 and the second remote terminal 302 in response to the feedback signal.

The mobile terminal 100 may request the server 200 to end the generated network by transmitting the feedback signal to the server 200. In addition, the second remote terminal 302 may request the server 200 to end the generated network by receiving the feedback signal.

The data flow among the mobile terminal 100, the server 200 and the remote terminals 301 and 302 for implementing the remote capture service has been described.

Operations of the mobile terminal 100 according to an embodiment of the present invention will now be described in more detail.

Figure 6:
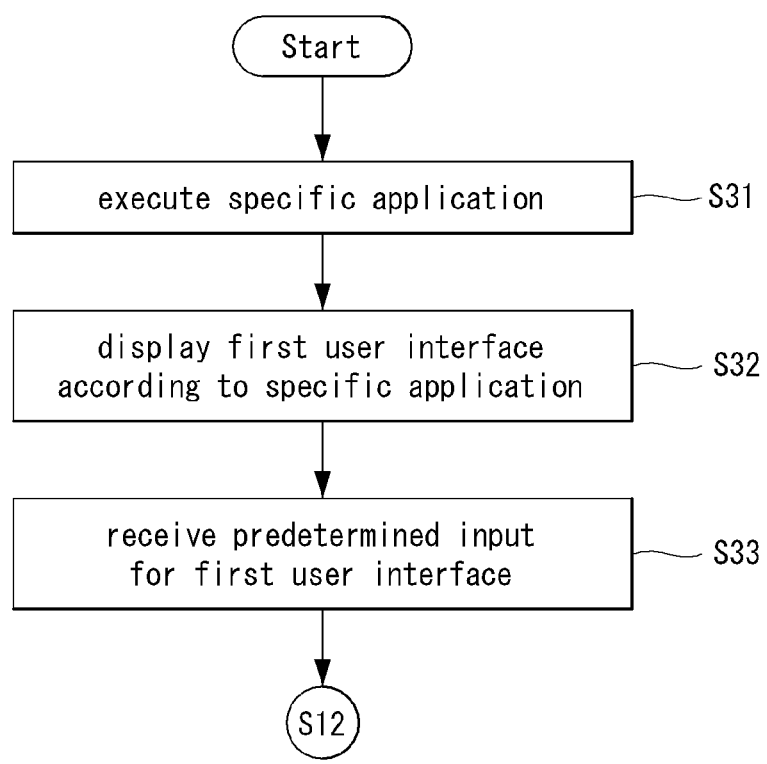
FIG. 6 is a flowchart illustrating the method of controlling a mobile terminal, shown in FIG. 4, in more detail.

FIG. 6 is a flowchart illustrating the method of controlling a mobile terminal shown in FIG. 4 in more detail.

Referring to FIG. 6, the controller 180 of the mobile terminal 100 may execute a specific application (S31).

According to the present embodiment of the invention, the mobile terminal 100 may request remote capture during execution of the specific application.

For example, the specific application may include at least one of the camera application, SNS application and map application.

The controller 180 may display a first user interface on the display unit 151 upon execution of the specific application (S32).

Figure 8:
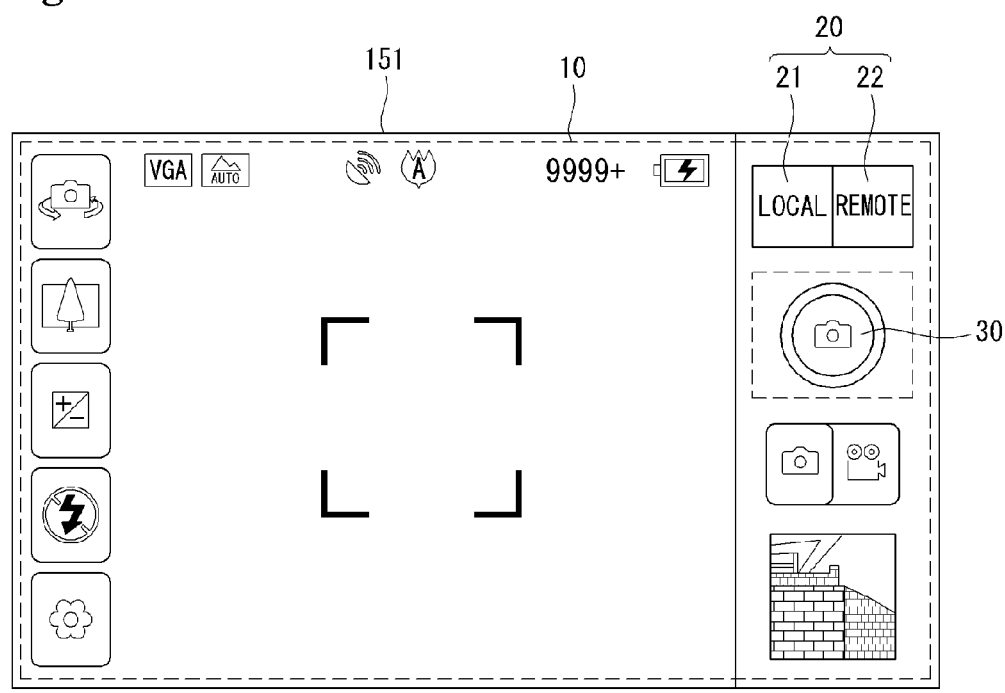
FIGS. 8 to 15 are diagrams for explaining the method of controlling a mobile terminal according to the first embodiment of the present invention.

For example, if the camera application is executed, the controller 180 can display the first user interface by which the camera (121 of FIG. 1) of the mobile terminal 100 can capture an image on the display unit 151, as shown in FIG. 8.

Figure 27:
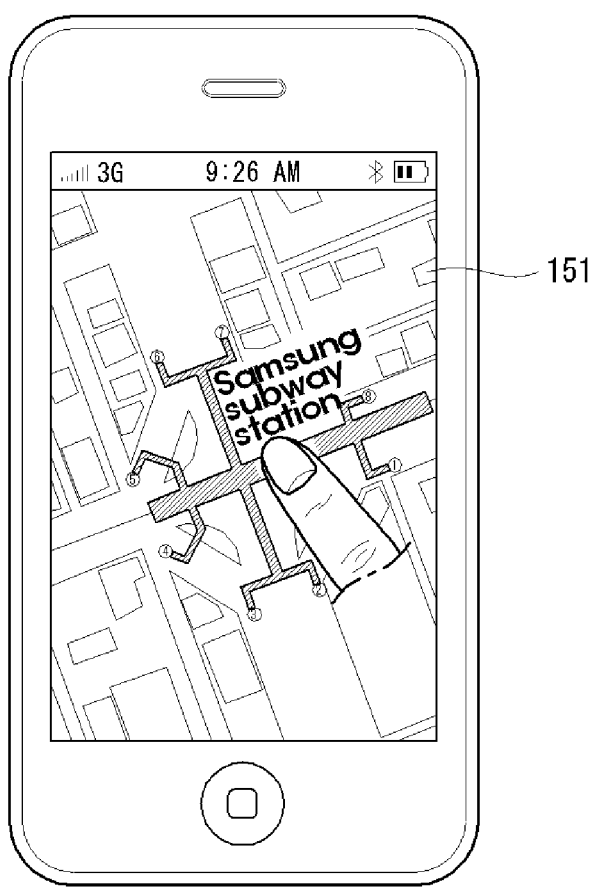
FIGS. 27 to 30 are diagram for illustrating the method of controlling a mobile terminal according to the third embodiment of the invention in more detail.

If the map application is executed, for example, the controller 180 can display map data (first user interface) on the display unit 151, as shown in FIG. 27.

Figure 32:
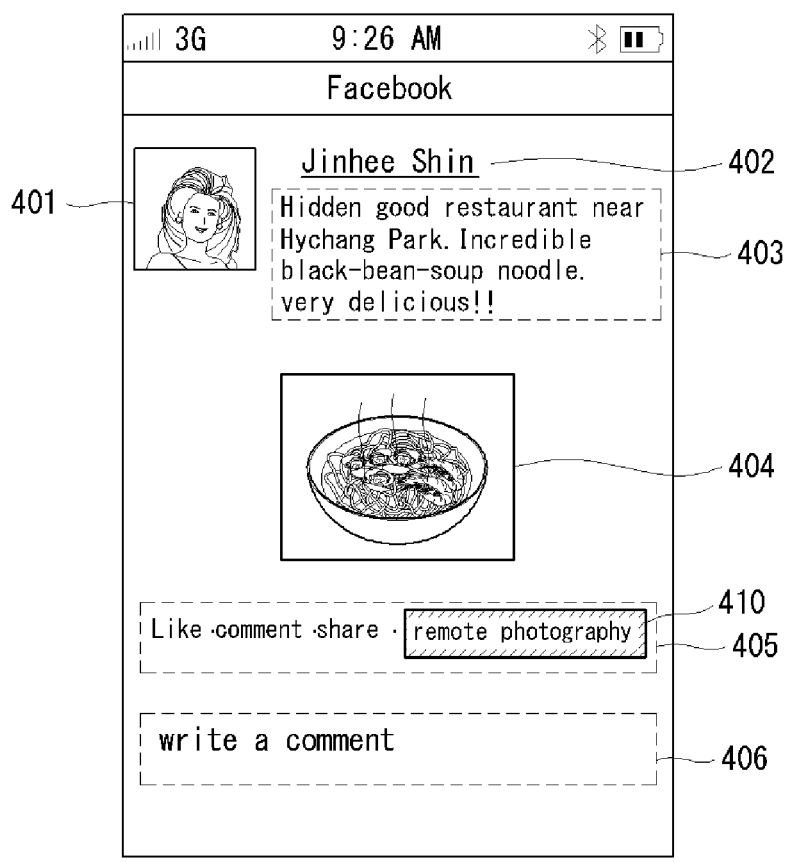
FIGS. 32 to 34E are diagrams for illustrating the method of controlling a mobile terminal according to the fourth embodiment of the invention in more detail.

When the SNS application is executed, for instance, the controller 180 can display the first user interface for implementing a social network service on the display unit 151, as shown in FIG. 32.

The controller 180 may receive a predetermined input for the first user interface (S33).

For example, if the camera application is executed, the first user interface can include regions by which the image capture mode and remote capture mode can be selected. Upon reception of an input applied to the region for selecting the remote capture mode, the controller 180 can control the mobile terminal 100 to operate in the remote capture mode (refer to FIG. 8).

Figure 28:
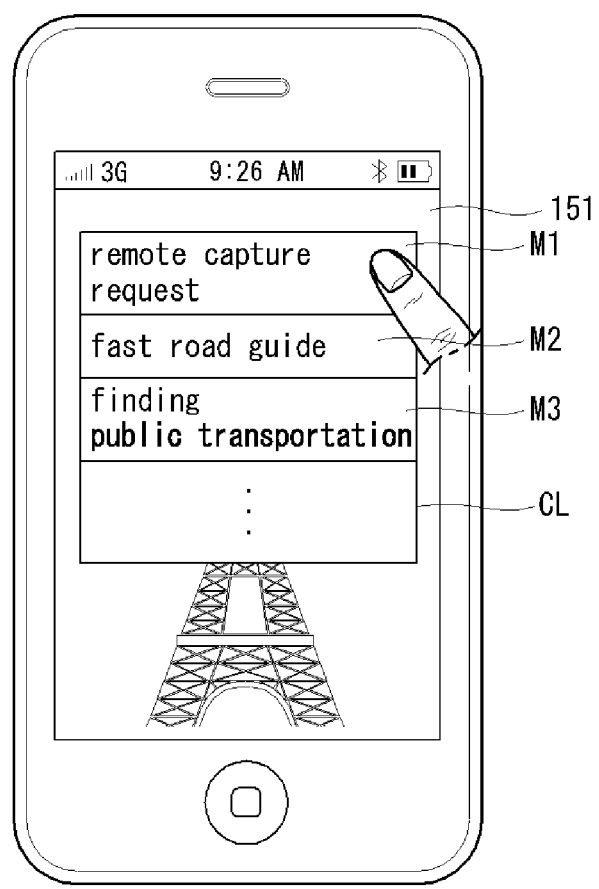
Figure 29:
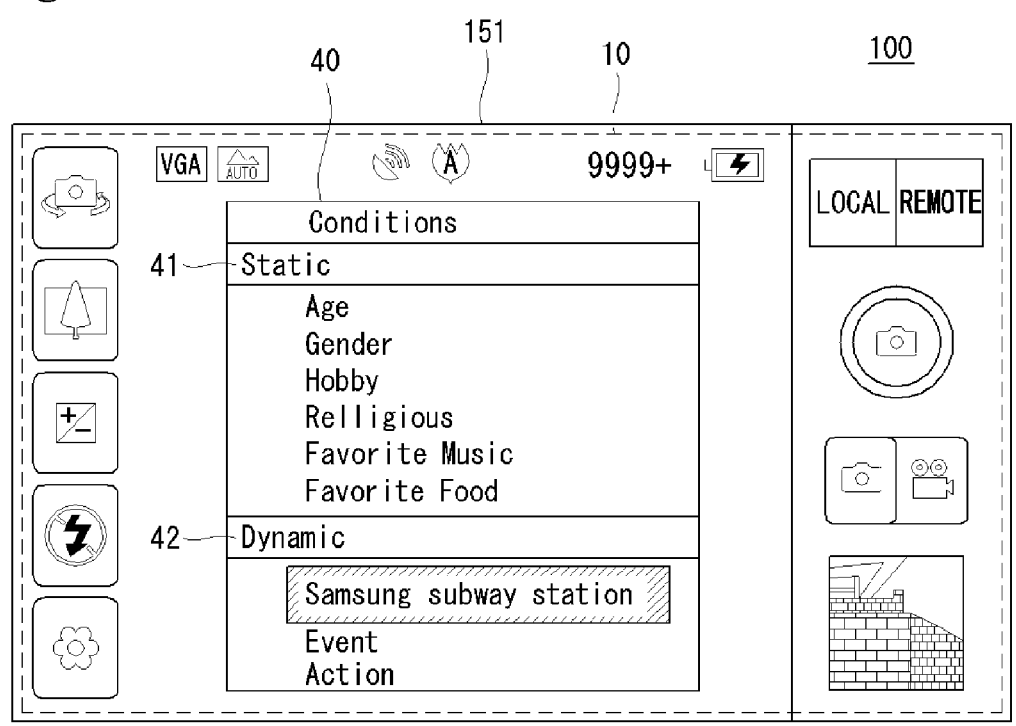
Figure 30:
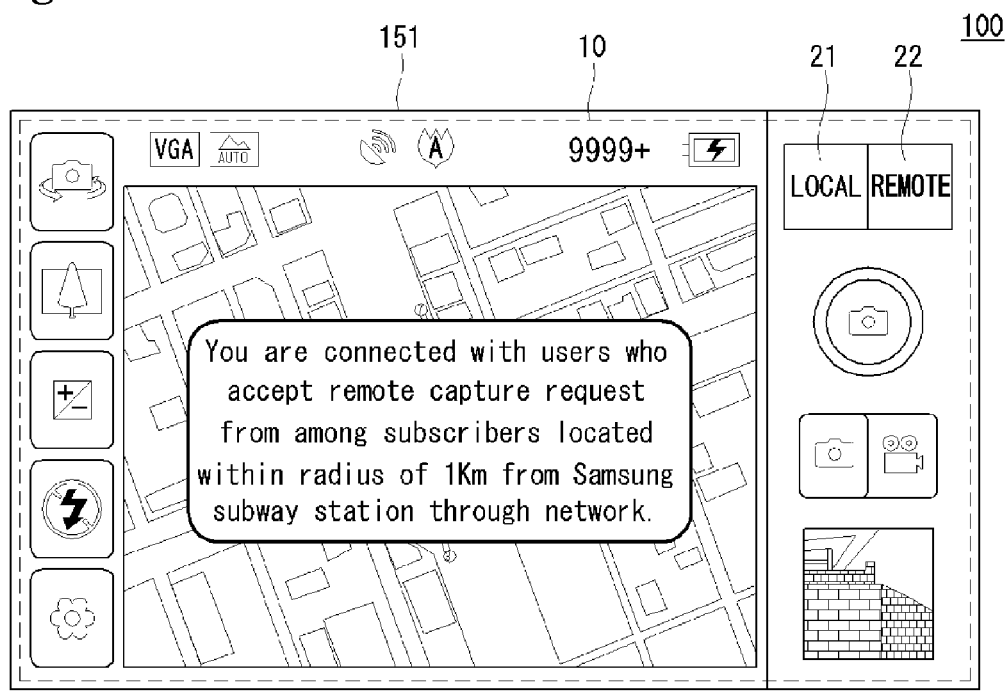

For example, if the first user interface is a map and a long touch input to a specific point on the map is received while the map application is executed, a pop-up menu window for requesting remote capture may be displayed on the display unit 151 (refer to FIGS. 27 and 28). Upon reception of an input for selecting a remote capture menu displayed in the pop-up menu window, the mobile terminal 100 can transmit the remote capture request signal to a remote terminal.

Furthermore, if the SNS application, for example, Facebook® application is executed, the first user interface may include images of Facebook® users, posted content, and a comment area in which Facebook® users can write comments about the posted content (refer to FIG. 32). The first user interface may further include a link area for remote capture and receive an input to the link area. Accordingly, the mobile terminal 100 can transmit the remote capture request signal to a remote terminal.

Detailed embodiments of the present invention will now be described with reference to related drawings.

Figure 7:
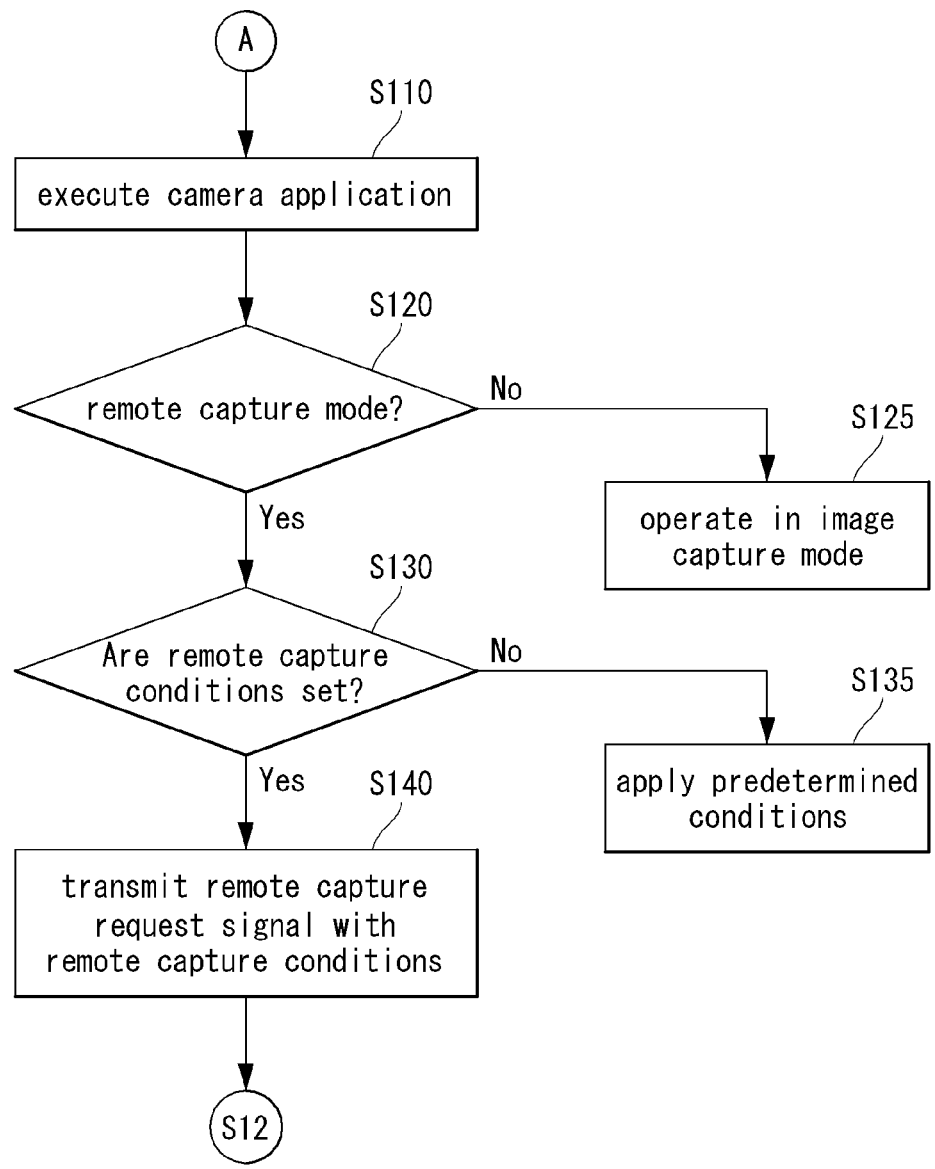
FIG. 7 is a flowchart illustrating a method of controlling a mobile terminal according to a first embodiment of the present invention.

FIG. 7 is a flowchart illustrating a method of controlling a mobile terminal according to a first embodiment of the present invention.

The method of controlling a mobile terminal according to the first embodiment of the present invention may be implemented in the mobile terminal 100 described above with reference to FIG. 1. The method of controlling a mobile terminal according to the first embodiment of the invention and operations of the mobile terminal 100 to implement the same will be described in detail. The first embodiment may be based on the embodiments described with reference to FIGS. 4 to 6.

The mobile terminal 100 may execute the camera application (S110). Upon execution of the camera application, the first user interface (10 shown in FIG. 8) for image capture may be displayed on the display unit 151.

The controller 180 may determine whether the mobile terminal 100 enters the remote capture mode through an input applied to a first region 20 (S120).

When the mobile terminal 100 enters the remote capture mode (S120: YES), the controller 180 may provide a menu window for setting remote capture conditions to the display unit 151. And the controller 180 may operate capture mode (S125: NO) when the mobile terminal 100 dose note enter the remote capture mode.

When the remote capture conditions are set according to user input or automatically (S130: YES), the controller 180 may transmit a remote capture request signal with the remote capture conditions (S140).

When there is no procedure of setting the remote capture conditions, the controller 180 may perform remote capture request by applying a predetermined condition thereto (S135).

FIGS. 8 to 15 are diagrams for explaining the method of controlling a mobile terminal according to the first embodiment of the invention.

FIG. 8 shows an exemplary screen for explaining step S110 of FIG. 7.

Referring to FIG. 8, the first user interface 10 may include a region (first region) 20 for selecting the image capture mode and the remote capture mode in which the mobile terminal 100 operates. For example, if an input to "Local" area 21 shown in FIG. 8 is received, the mobile terminal 100 can enter the image capture mode in which the camera (121 of FIG. 1) can capture an image. When an input to "Remote" region 22 is received, the mobile terminal 100 can enter the remote capture mode in which the mobile terminal 100 can request a remote terminal to perform remote capture.

The first user interface 10 may include a second region 30 for transmitting the remote capture request signal to a remote terminal in the remote capture mode. The second region 30 may be used as an input region for capturing an image in the image capture mode and used as an input region for transmitting the remote capture request signal to the remote terminal in the remote capture mode.

FIG. 9 shows an exemplary screen for explaining step S130 of FIG. 7.

Referring to FIG. 9, the controller 180 may display a menu 40 for setting the remote capture conditions on the display unit 151 in the remote capture mode.

The remote capture conditions may include a receiver condition. The receiver condition may include a static condition regardless of the passage of time or a dynamic condition dynamically varying with time.

The static condition may include profile information of a receiver who will perform remote capture.

The profile information may include personal information such as an age, gender, hobby, religion, favorite music, favorite food.

The dynamic condition may include location information of the receiver, information about an event in which the receiver currently participates.

FIG. 9 shows a procedure of setting remote capture conditions of the receiver. However, the remote capture conditions are not limited thereto. For example, the remote capture conditions can include information about time when the remote capture request is transmitted to the receiver, and information of requesting transmission of an image acquired upon reception of the remote capture request within a predetermined time.

FIG. 10 shows another exemplary screen for explaining step S130 of FIG. 7.

Referring to FIG. 10, the remote capture conditions may include a time condition. The time condition may include a request time at which the remote capture request is transmitted to the receiver and a validation time at which a remote capture result is transmitted to a remote capture requester.

The request time is used to transmit the remote capture request signal to the receiver at a specific time in the future. For example, if a picture of the Eiffel tower, taken in the evening, is requested in the morning, the controller 180 can control the remote capture request signal to be transmitted to the receiver after 8 hours from now by setting the request time to after 8 hours.

The validation time may be a means of forcing a receiver to respond within a specific time from reception of the remote capture request signal. Accordingly, it is possible to acquire a desired picture within an appropriate time and prevent an excessively large number of pictures from being transmitted by setting the validation time.

FIG. 11 shows another exemplary screen for explaining step S130 of FIG. 7.

Referring to FIG. 11, the mobile terminal 100 may receive a message that requests the mobile terminal 100 to capture a predetermined image and transmit the message to a remote terminal. To perform this, the controller 180 may display a message creation screen 55 along with the menu (40 of FIG. 9 and 50 of FIG. 10) for setting the remote capture conditions on the display unit 151.

Figure 12:
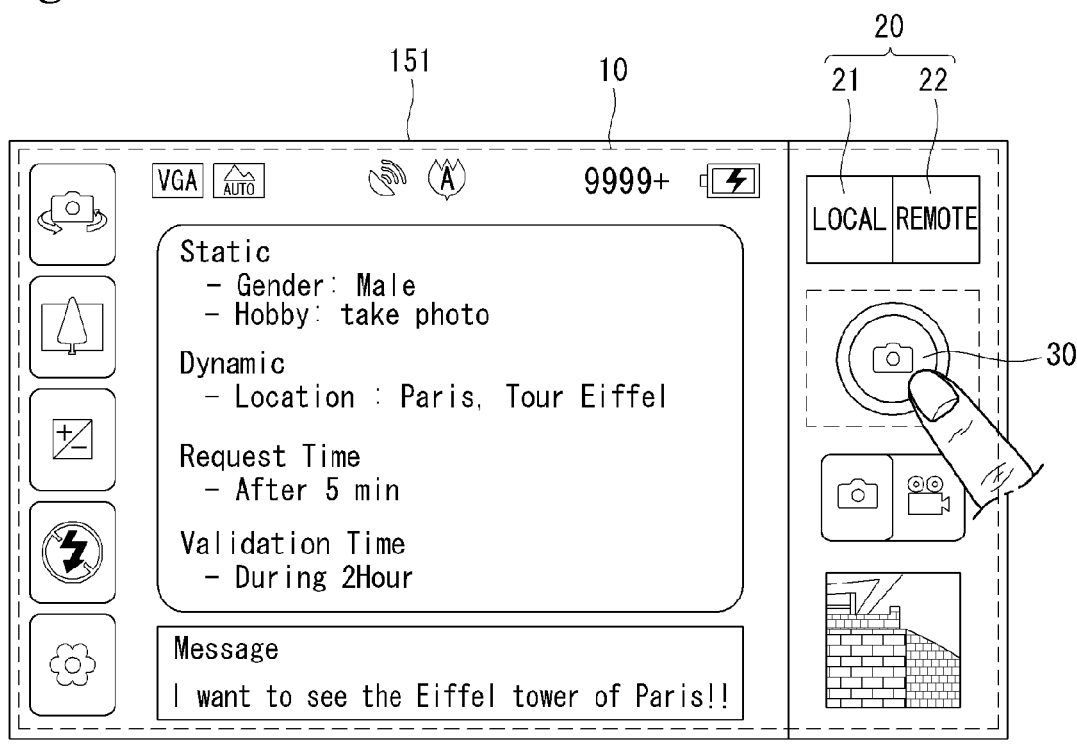

FIG. 12 shows an exemplary screen for explaining step S140 of FIG. 7.

Referring to FIG. 12, the controller 180 may display the set remote capture conditions on the display unit 151 when the remote capture conditions have been set (S130: YES of FIG. 7). For example, the remote capture requester requests a receiver who is a male, has a hobby of taking photos and is currently located near the Eiffel tower of Paris to take a picture of the Eiffel tower and to transmit the picture within two hours (validation time).

When the controller 180 receives an input to the second region 30 of FIG. 12, the controller 180 can control the remote capture request signal including the remote capture conditions to the receiver after 5 minutes (Request time).

Figure 13:
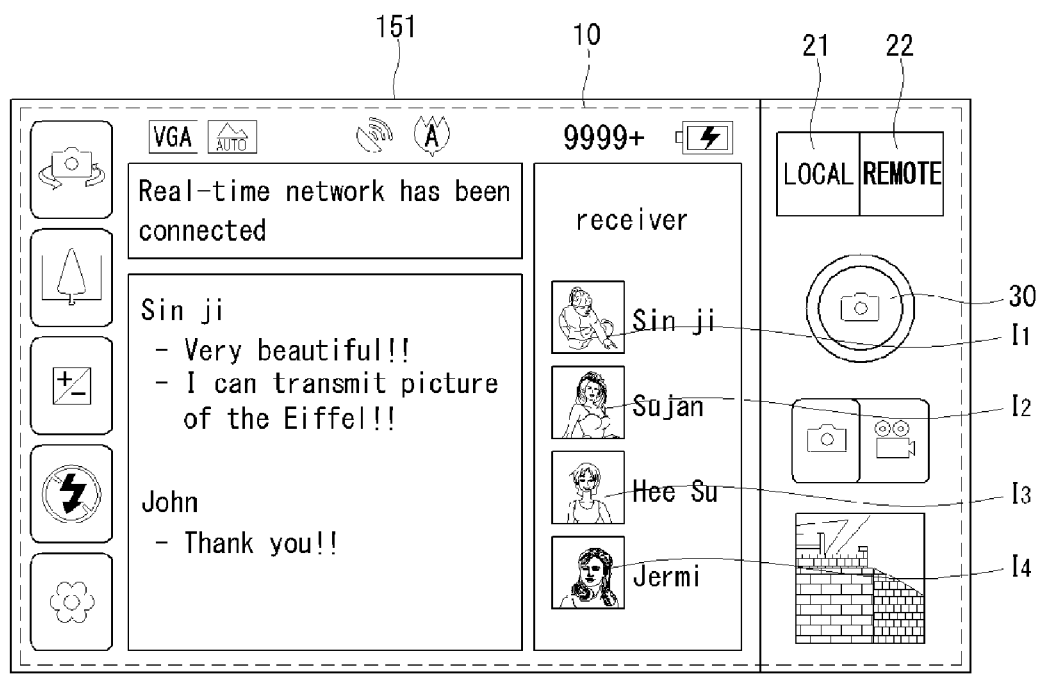

FIG. 13 illustrates a real-time messenger between the remote capture requester and receivers.

Referring to FIG. 13, the mobile terminal 100 may perform a real-time messenger function with one or more remote terminals that satisfy the remote capture conditions.

The mobile terminal 100 may configure an instant network with the one or more remote terminals that satisfy the remote capture conditions.

The controller 180 may display profile information I1, I2, I3 and I4 of remote terminal users who accept the remote capture request on the display unit 151. The profile information may include images and names of the users.

A message for requesting a specific receiver to capture a specific image can be transmitted through the real-time messenger function.

Figure 14:
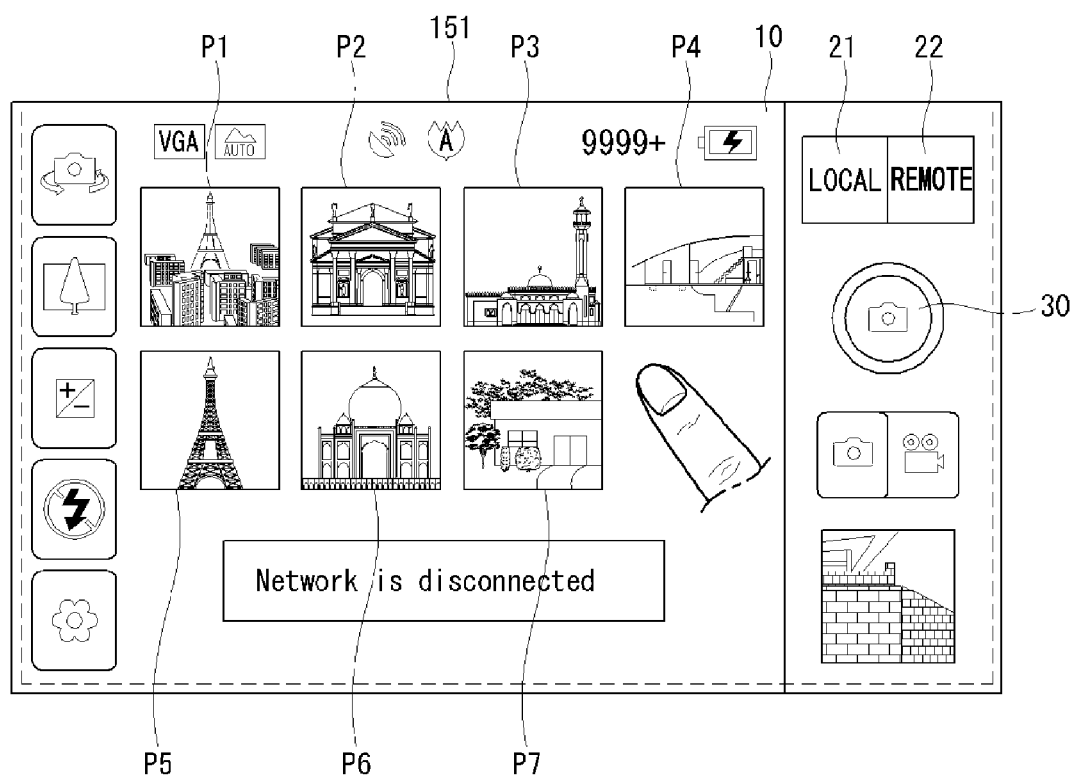

FIG. 14 shows images captured by remote terminals, received from the remote terminals and displayed on the display unit 151 of the mobile terminal 100.

Referring to FIG. 14, the controller 180 may receive the images captured by the remote terminals. The controller 180 may receive the images captured by the remote terminal from the server 200.

The controller 180 may display one or more received images P1, P2, P3, P4, P5, P6 and P7 on the display unit 151.

The controller 180 may end the network instantly generated between the mobile terminal 100 and the remote terminals upon selection of one or more received images P1 and P2.

Figure 15:
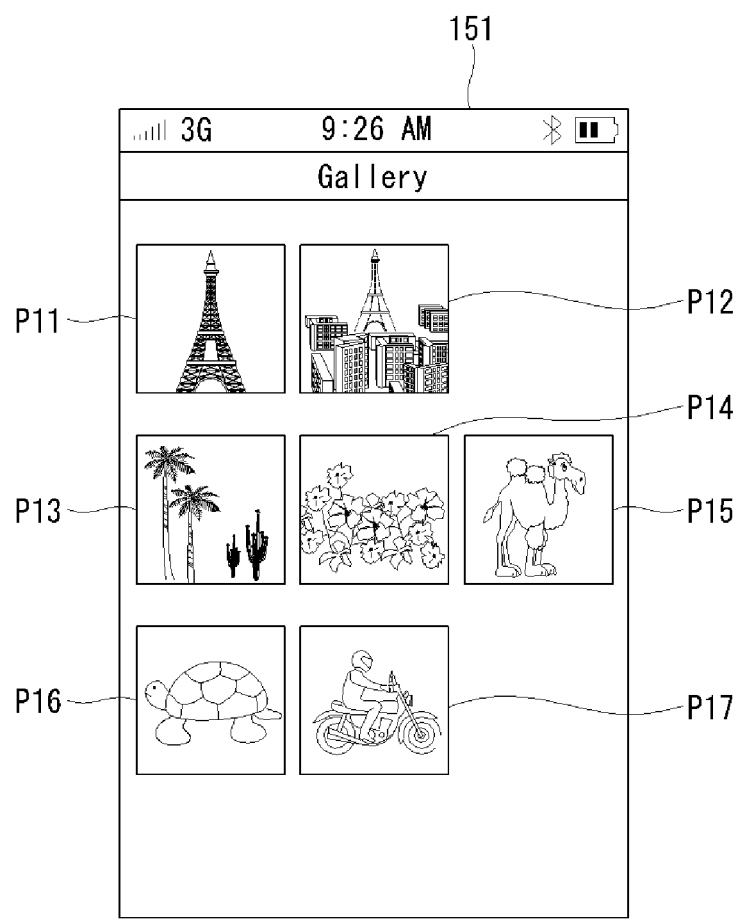

Referring to FIG. 15, the selected images P11 and P12 may be stored along with one or more other images P13, P14, P15, P16 and P17 previously stored in the mobile terminal 100.

Figure 16:
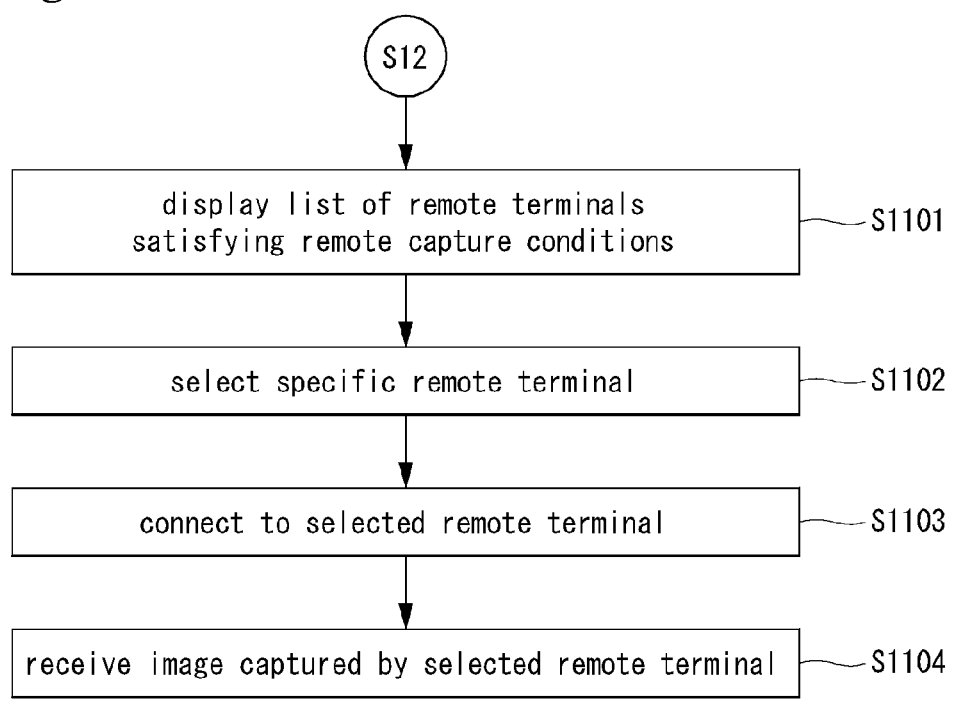
FIGS. 16 to 18 are diagram for illustrating the method of controlling a mobile terminal according to the first embodiment of the invention, shown in FIG. 7, in more detail.
Figure 17:
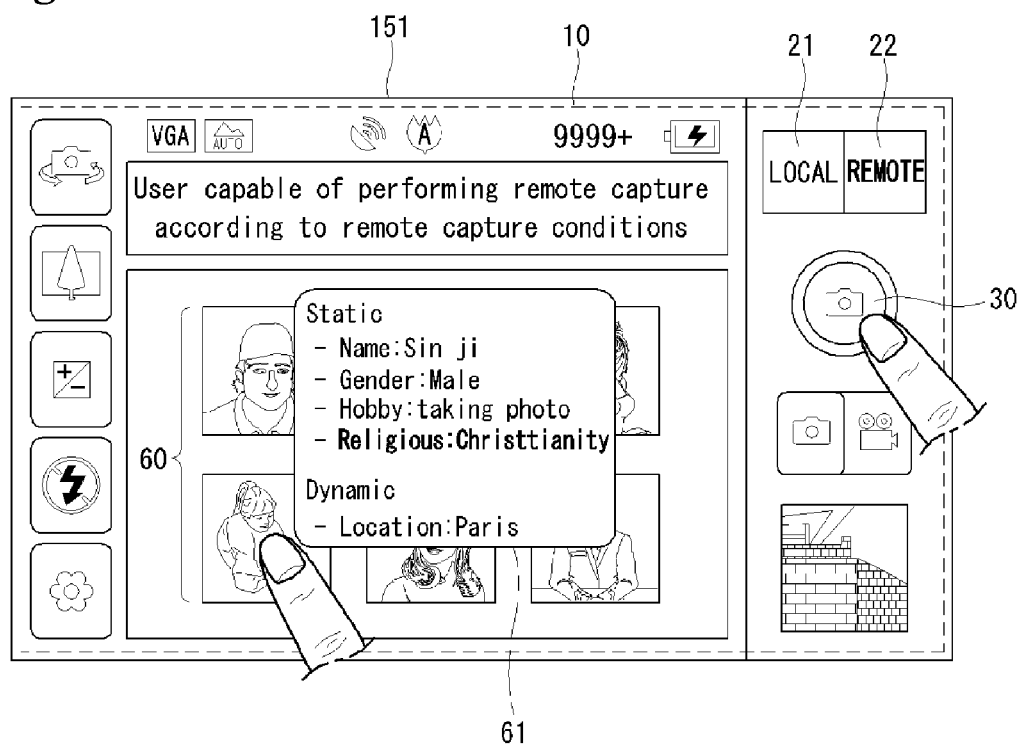
Figure 18:
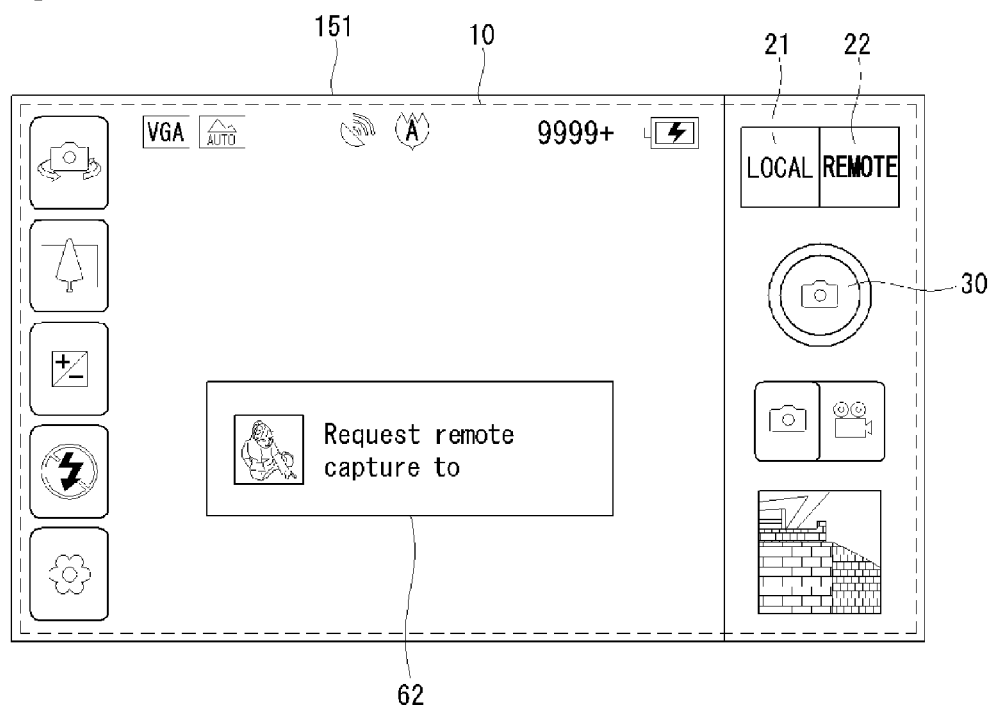

FIGS. 16 to 18 are diagrams for explaining the first embodiment of FIG. 7 in more detail.

The controller 180 may transmit the remote capture request signal to the server 200, and the server 200 may search for one or more remote terminals that meet the remote capture conditions included in the remote capture request signal.

The server 200 may transmit the search result to the mobile terminal 100.

Accordingly, the controller 180 may display a list of remote terminals that meet the remote capture conditions on the display unit 151 (S1101).

For example, referring to FIG. 17, the remote terminal list may include identification information (images) of receivers.

When an input for selecting one of receivers from a receiver list 60 is received, information 61 about the selected receiver may be displayed on the display unit 151.

The information 61 may include a static condition and a dynamic condition. Referring to FIG. 17, if picture "Sin Ji" is selected, for example, the controller 180 can display a user profile corresponding to a receiver who is a male Christian having a name "Sin Ji" and has a hobby of taking photos. In addition, the controller 180 can display current location "Paris".

Accordingly, the remote capture requester can select "Sin Ji" as a receiver upon determining that "Sin Ji" can capture and provide the best picture that the remote capture requester wants.

Furthermore, the controller 180 may display a pop-up message 62 indicating that "Sin Ji" has been selected as a receiver on the display unit 151, as shown in FIG. 18.

Accordingly, the remote capture requester may receive a desired image captured by the receiver using the receiver list 60 received from the server 200.

Figure 19:
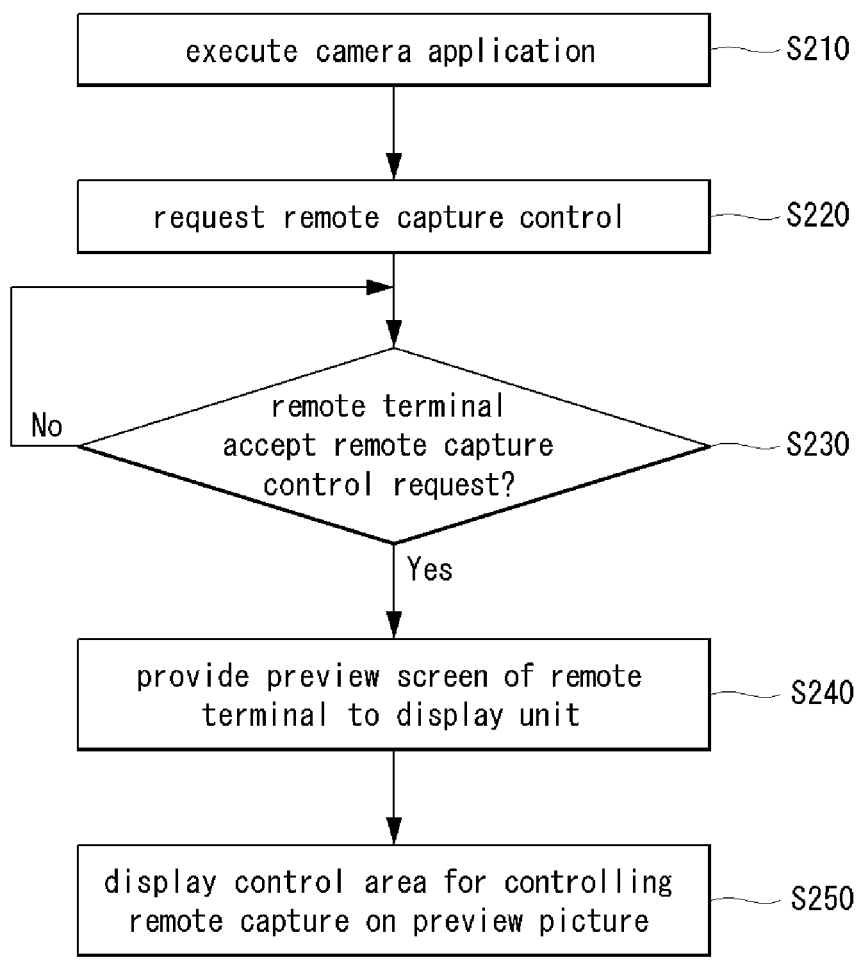
FIG. 19 is a flowchart illustrating a method of controlling a mobile terminal according to a second embodiment of the present invention.

FIG. 19 is a flowchart illustrating a method of controlling a mobile terminal according to a second embodiment of the present invention.

The method of controlling a mobile terminal according to the second embodiment of the invention may be implemented in the mobile terminal 100 described above with reference to FIG. 1. The method of controlling a mobile terminal according to the second embodiment of the invention and operations of the mobile terminal 100 to implement the method will now be described in detail with reference to related drawings.

In the second embodiment shown in FIG. 19, the mobile terminal 100 performs remote capture through the camera application and directly controls image capture of remote terminals.

Referring to FIG. 19, the controller 180 executes the camera application (S210).

The controller 180 may request remote capture control by transmitting a remote capture control signal to a remote terminal (S220). It is assumed that the remote terminal is a terminal that satisfies the remote capture conditions. That is, the mobile terminal 100 may transmit a remote capture request signal and a remote capture control request signal to the remote terminal.

When the remote terminal accepts the remote capture control request (S230), the remote terminal may execute the camera application and display a user interface for image capture on the display unit thereof.

The controller 180 of the mobile terminal 100 may display a preview screen of the remote terminal on the display unit 151 upon receiving acknowledgement from the remote terminal (S240).

The acknowledgement from the remote terminal means that the mobile terminal 100 acquires a control right for image capture performed by the remote terminal.

The controller 180 may provide a predetermined control area (CA) to the display unit 151 of the mobile terminal 100 such that the mobile terminal 100 can freely use the control right for image capture of the remote terminal (S250).

The control area CA is used to control image capture of the remote terminal.

Figure 20:
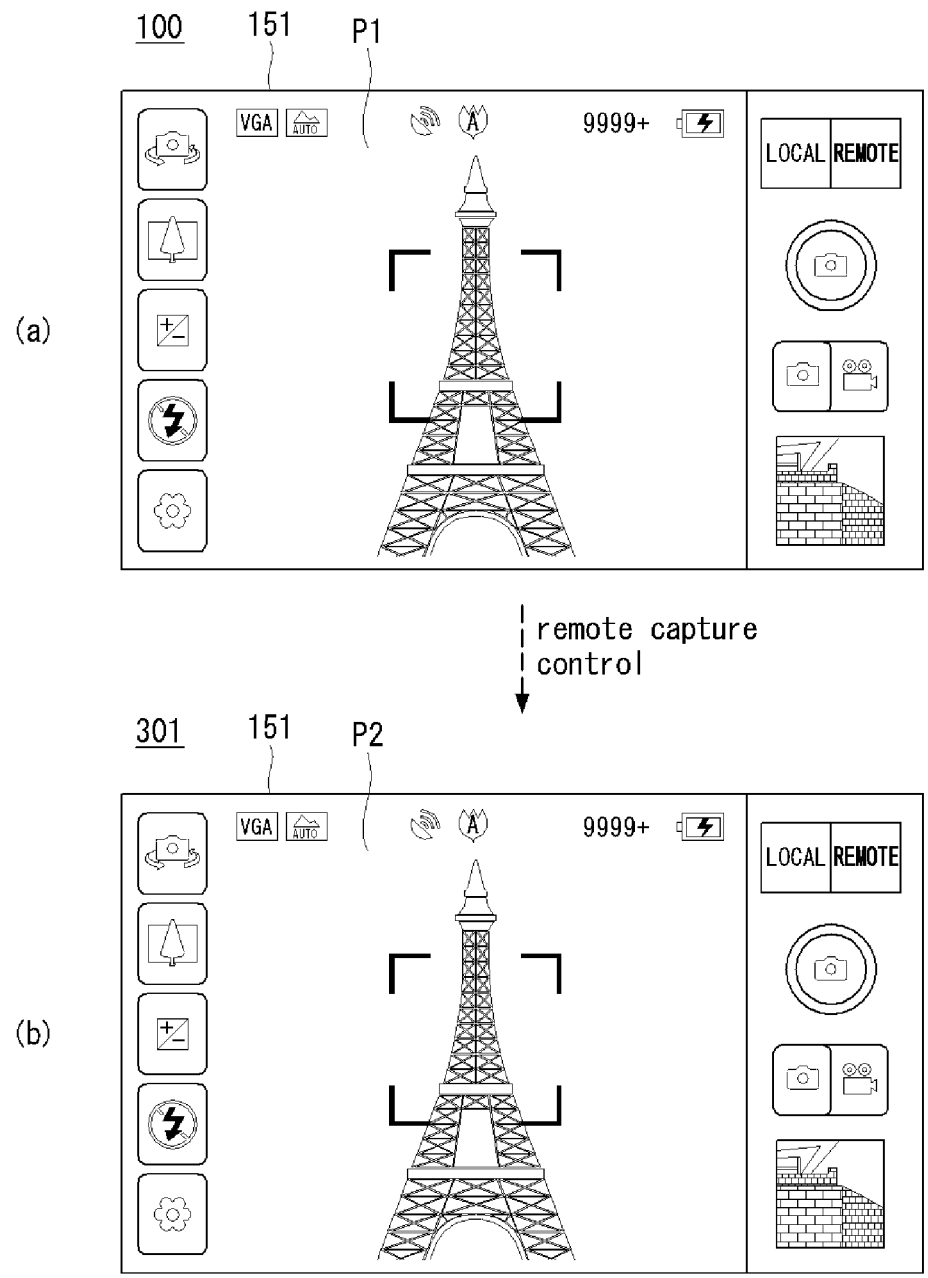
FIGS. 20 and 21 are diagrams for explaining the method of controlling a mobile terminal according to the second embodiment of the present invention.
Figure 21:
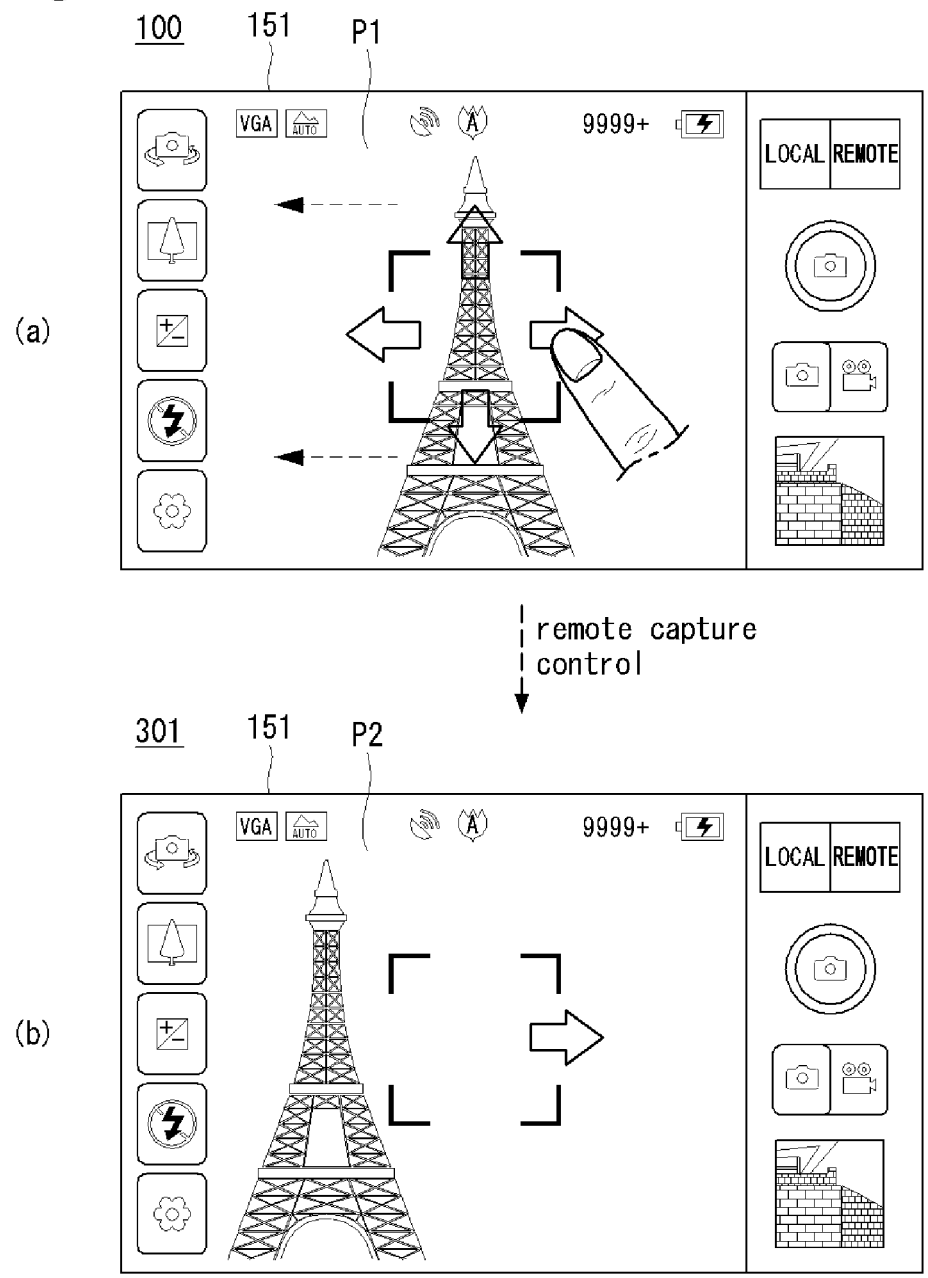

FIGS. 20 and 21 are diagrams for explaining the method of controlling a mobile terminal according to the second embodiment of the invention.

Referring to FIG. 20, when a remote terminal 301 accepts the remote capture control request of the mobile terminal 100, the camera application of the remote terminal 301 is automatically executed and a preview screen P2 of the remote terminal 301 may be displayed on the display unit 151 of the mobile terminal 100. Accordingly, the preview screen P1 displayed on the display unit 151 of the mobile terminal 100 may be synchronized with the preview screen P2 of the remote terminal.

Referring to FIG. 21, a control area CA displayed on the preview screen P1 of the mobile terminal 100 may include arrows by which a movement direction of the preview screen P2 of the remote terminal 301 can be controlled.

Accordingly, when the controller 180 receives a touch input to the right arrow of the control area CA, the controller 180 may display a direction guide indicator (DGI) (e.g. an arrow to the right) that indicates a direction to which the camera of the remote terminal 301 will move on the screen of the remote terminal 301.

The operation of providing the preview screen of the remote terminal 301 to the mobile terminal 100 to control image capture of the remote terminal 301 has been described in the second embodiment.

The mobile terminal 100 may receive images captured by one or more remote terminals that accept the remote capture request and select a remote terminal to which the mobile terminal 100 will transmit the remote capture control signal by selecting one of the received images.

Figure 22:
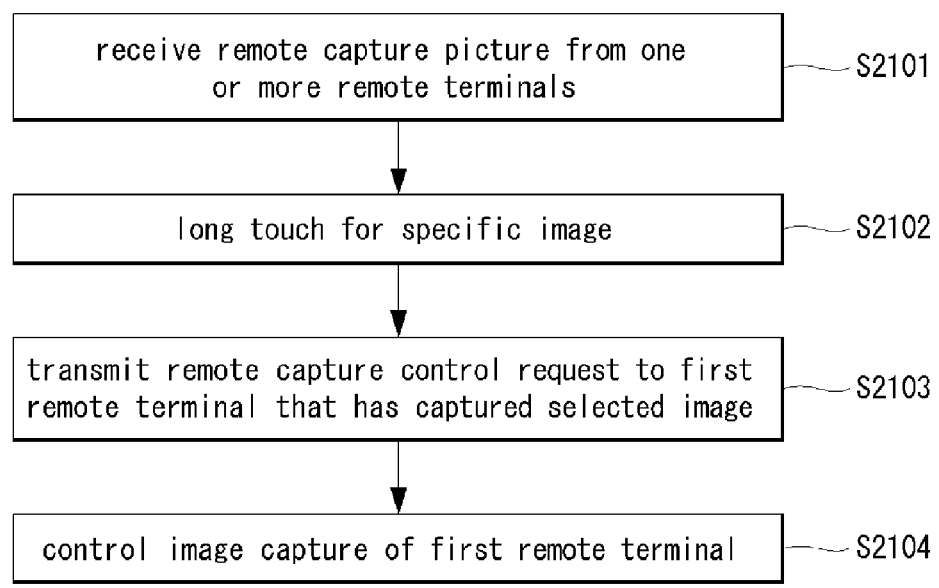
FIGS. 22 to 24 are diagram for illustrating the method of controlling a mobile terminal according to the second embodiment of the invention, shown in FIG. 19, in more detail.
Figure 23:
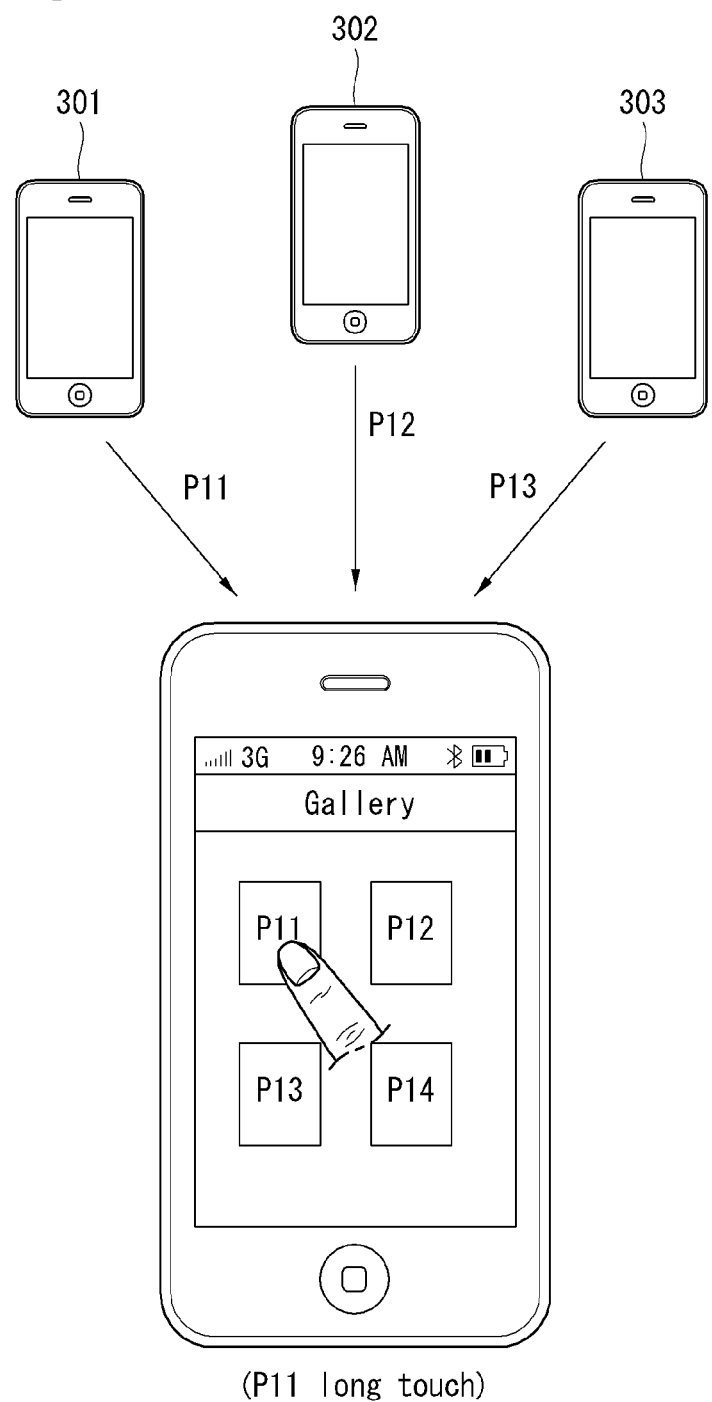
Figure 24:
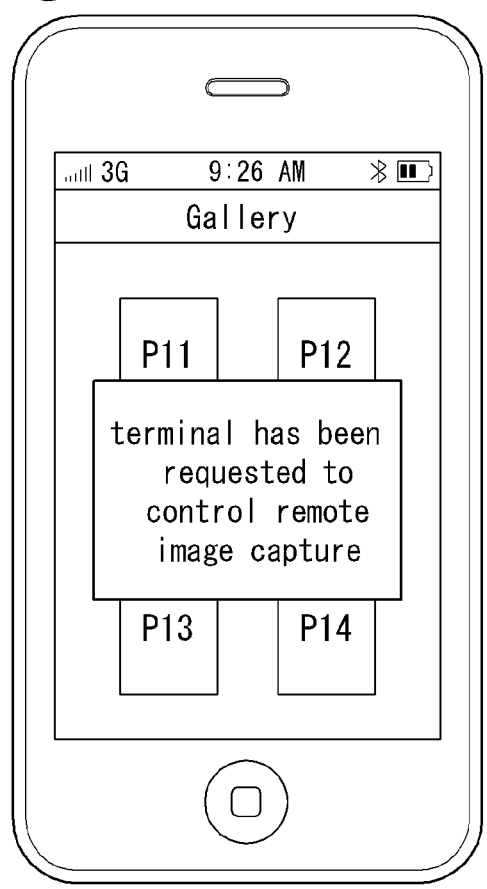

FIGS. 22 to 24 are diagrams for explaining the second embodiment shown in FIG. 19 in more detail.

Referring to FIGS. 22 to 24, the controller 180 may receive remotely captured images P11, P12, P13 and P14 from one or more remote terminals 301, 302 and 303 (S2101).

When the controller 180 receives a long touch input for the specific image P11 from among the received images (S2102), the controller 180 may request remote capture control to the first remote terminal 301 that has captured the long touched image (S2103).

When the first remote terminal accepts the remote capture control request of the mobile terminal 100, the controller 180 can control remote capture of the first remote terminal (2104).

In the embodiment described with reference to FIG. 22, if the images remotely captured and received do not include a desired image, a specific image may be selected from the received images and the remote capture control request signal may be transmitted to a remote terminal that has captured the specific image.

For example, if a desired view is not present in a picture of the Eiffel tower of Paris, received from the first remote terminal, the mobile terminal 100 can transmit the remote capture control request signal to the first remote terminal such that the first remote terminal captures a picture including the desired view.

Examples of implementing the remote capture service during execution of the camera application have been described through the first and second embodiments of the invention. However, the present invention is not limited thereto. That is, the remote capture service may be provided while the map application instead of the camera application is executed.

Figure 25:
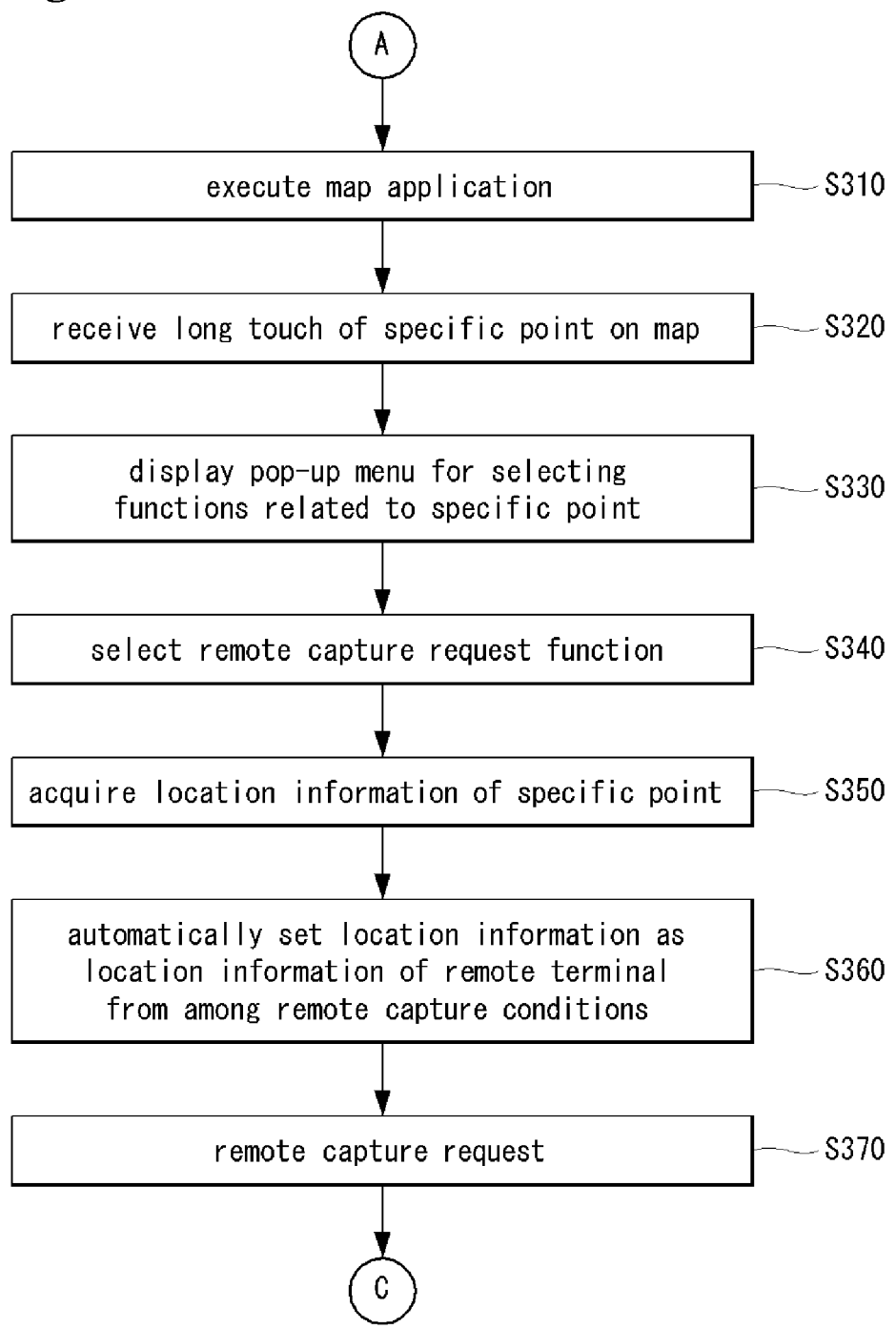
FIG. 25 is a flowchart illustrating a method of controlling a mobile terminal according to a third embodiment of the present invention.
Figure 26:
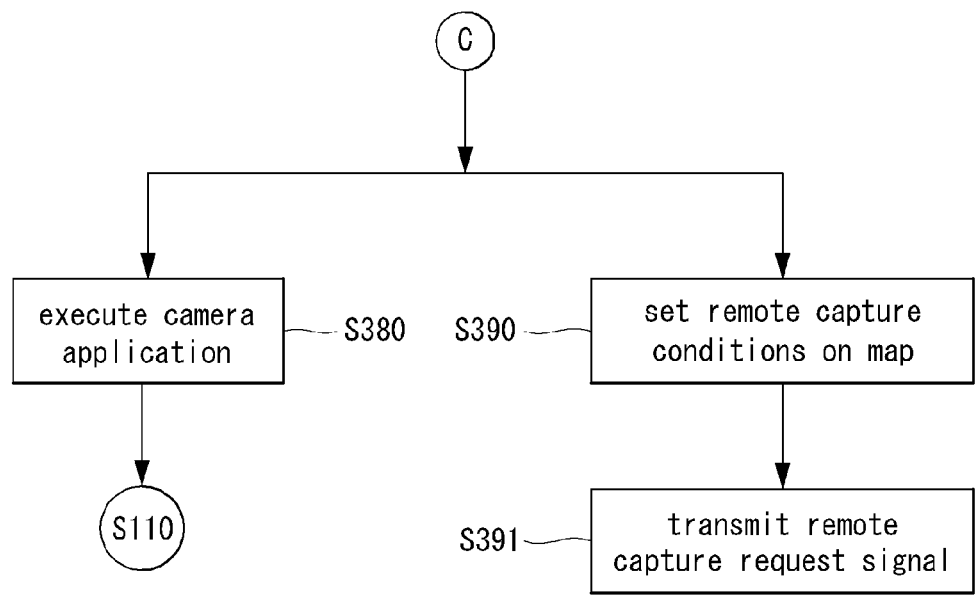
FIG. 26 is a flowchart for illustrating the method of controlling a mobile terminal according to the third embodiment of the invention, shown in FIG. 25, in more detail.

FIG. 25 is a flowchart illustrating a method of controlling a mobile terminal according to a third embodiment of the present invention. FIG. 26 is a flowchart illustrating the third embodiment of FIG. 25 in more detail, and FIGS. 27 to 30 are diagrams for explaining the method of controlling a mobile terminal according to the third embodiment of the invention.

The method of controlling a mobile terminal according to the third embodiment of the invention may be implemented in the mobile terminal 100 described above with reference to FIG. 1. The method of controlling a mobile terminal according to the third embodiment of the invention and operations of the mobile terminal 100 to implement the method will now be described in detail with reference to related drawings.

Referring to FIG. 25, the controller 180 may execute the map application (S310).

Upon execution of the map application, the controller 180 may display a map on the touchscreen 151. The controller 180 may receive a long touch input applied to a specific point on the map (S320).

For example, referring to FIG. 27, the controller 180 can display a map of an area around Samsung subway station on the touchscreen 151 and receive a long touch input to Samsung subway station.

The controller 180 may display a pop-up menu CL for selecting functions related to the long-touched specific point on the touchscreen 151 (S330).

Referring to FIG. 28, the functions related to the specific point may include a function M1 of requesting capture of a view of the long-touched point, a function M2 of fast road guide to the long-touched point, a function M3 for finding public transportation.

If the remote capture requesting function M1 is selected (S340), the controller 180 may automatically execute the camera application to enter the remote capture mode described above in the first embodiment, as shown in FIG. 29.

In the remote capture mode, the controller 180 may display the menu 40 for setting remote capture conditions.

In the third embodiment of executing a remote capture function through the map application, the controller 180 may acquire location information about the specific point upon receiving the long touch input to the specific point (S350).

The controller 180 may automatically set the acquired location information as location information of a remote terminal among the remote capture conditions (S360). That is, upon reception of the long touch input for the Samsung subway station in FIG. 27, location information, that is, Samsung subway station, is automatically set as location information from among the remote capture conditions.

When the long touch input for the specific point is received, the controller 180 may transmit the remote capture request signal to one or more remote terminals located within a predetermined distance from the specific point.

Furthermore, the controller 180 may transmit the remote capture request signal to the server 200. In addition, the controller 180 may receive a list of one or more remote terminals which are located within the predetermined distance and satisfy the remote capture conditions from the server 200 and display the list on the display unit 151.

The user of the mobile terminal 100 can be provided with the remote capture request service based on the specific point and a specific remote terminal by selecting the specific remote terminal from the remote terminal list.

An example of implementing the remote capture service while the mobile terminal 100 executes the map application has been described through the third embodiment. According to the third embodiment of the invention, when remote capture is requested through the map application, it is not necessary to additionally set location information from among the remote capture conditions.

An example of implementing the remote capture service during execution of the SNS application will now be described through a fourth embodiment of the invention.

Figure 31:
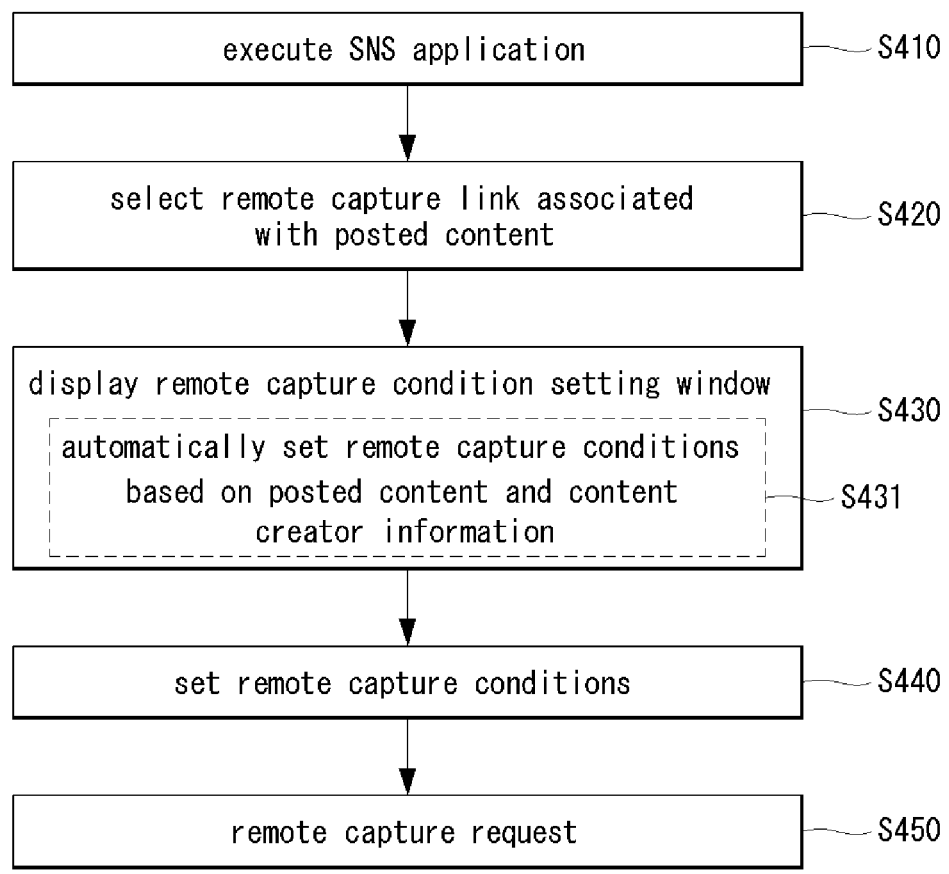
FIG. 31 is a flowchart illustrating a method of controlling a mobile terminal according to a fourth embodiment of the present invention.
Figure 33:
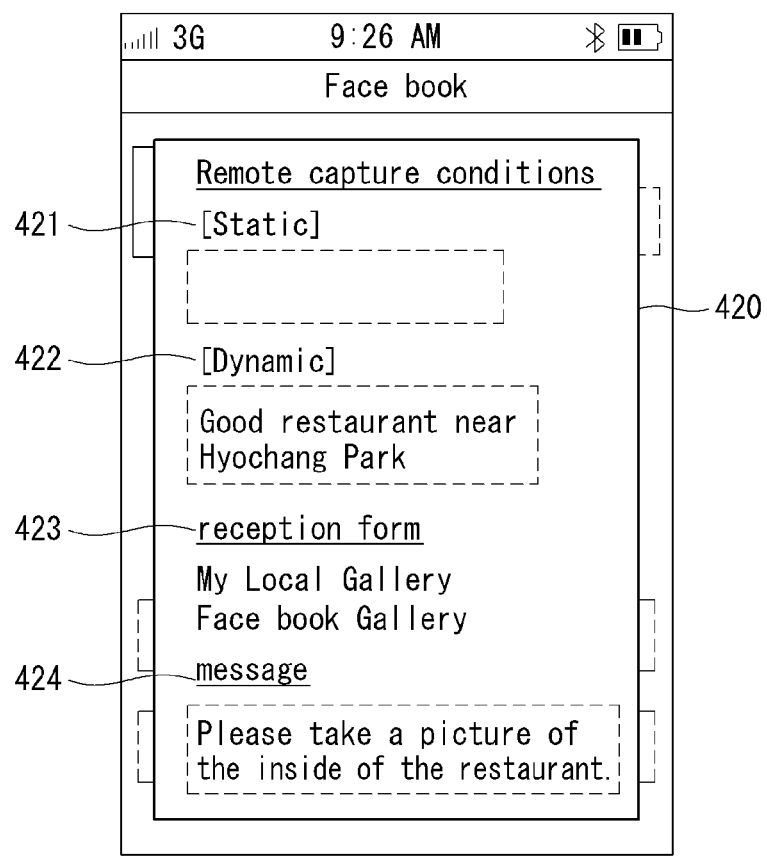

FIG. 31 is a flowchart illustrating a method of controlling a mobile terminal according to the fourth embodiment of the invention and FIGS. 32 to 34 are diagrams for explaining the method of controlling a mobile terminal according to the fourth embodiment of the invention.

The method of controlling a mobile terminal according to the fourth embodiment of the invention may be implemented in the mobile terminal 100 described above with reference to FIG. 1. The method of controlling a mobile terminal according to the fourth embodiment of the invention and operations of the mobile terminal 100 to implement the method will now be described in detail with reference to related drawings.

Referring to FIG. 31, the controller 180 may execute the SNS application (S410).

Upon execution of the SNS application, the controller 180 may display a user interface for providing predetermined posted content on the touchscreen 151, as shown in FIG. 32.

The posted content may include an image 401 of a user who is using the social network service, the name 402 of the user, text information 403 posted by the user, and a photo 404 posted by the user.

The user interface may include an area 405 into which a comment, sharing and preference for the posted content are input. The area 405 may include a remote photography link 410.

The user interface may further include an area 406 in which a comment about the posted content is written.

Referring back to FIG. 31, upon selection of the remote photography link (410 of FIG. 32) associated with the posted content (S420), the controller 180 may disclose remote capture condition setting window (S430). That is, the controller 180 may automatically set remote capture conditions on the basis of the posted content and information about the user who creates the content (S431).

For example, referring to FIG. 32, the controller 180 can automatically set at least part of the remote capture conditions by analyzing the text information 403 posted by the user, "hidden good restaurant near Hyochang Part, incredible black-bean-soup noodle, very delicious" and the photo posted by the user.

That is, the controller 180 can set location information from among the remote capture conditions as "good restaurant serving black-bean-soup noodle located near Hyochang Part" by analyzing location information (Hyochang Park, good restaurant, black-bean-soup noodle) included in the text information posted by the user.

The controller 180 may set remote capture conditions other than the location information (S440) and request remote capture (S450). Here, the other remote capture conditions may include a static condition 421 and a dynamic condition 422 of a receiver, a reception form 423 for receiving a remote capture result and a remote capture request message 424.

It is possible to select whether a remotely captured image is stored in a local memory (160 of FIG. 1) or a gallery provided to the SNS application through the method 423 for receiving a remote capture result during execution of the SNS application.

FIGS. 34A to 34E show an example of requesting remote capture while a user posts predetermined content while executing the SNS application.

Figure 34A:
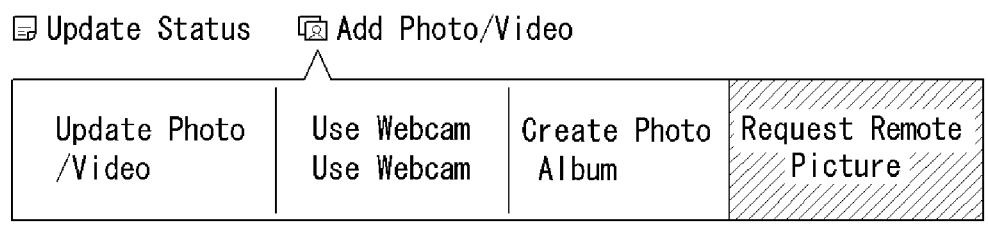
Figure 34B:
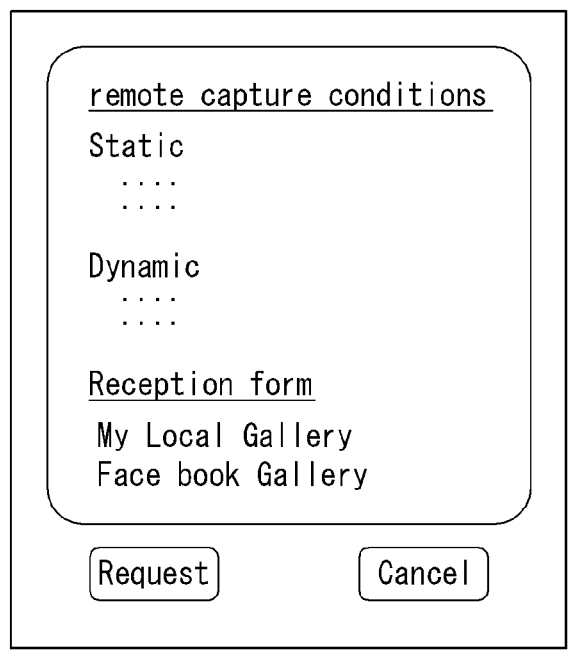
Figure 34C:
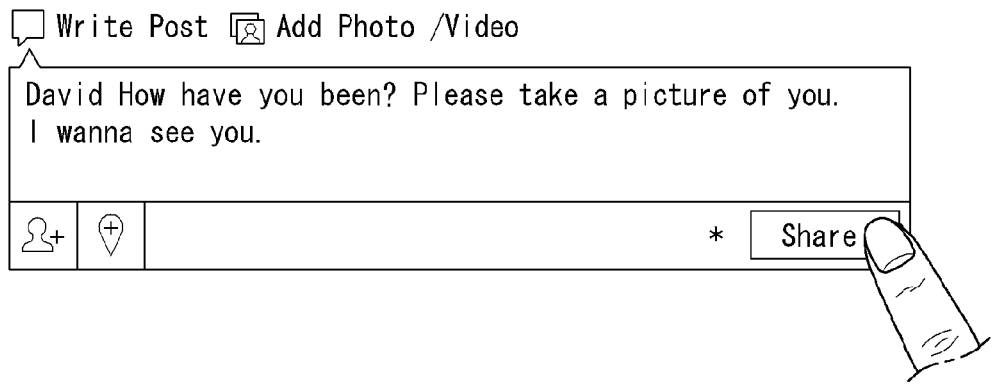

For example, the mobile terminal 100 requests a remote picture during execution of the SNS application (refer to FIG. 34A), and the controller 180 may provide a menu window for setting remote capture conditions in response to the request (refer to FIG. 34B).

Figure 34D:
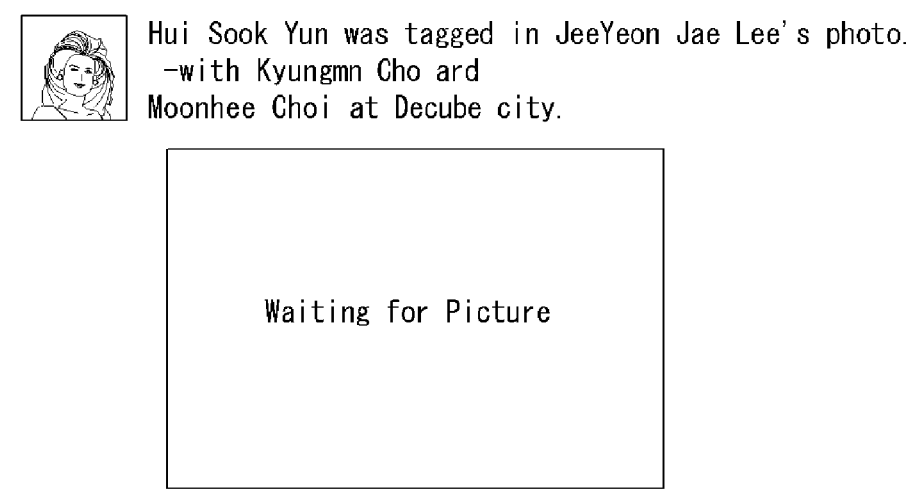

When a share button is pressed after the remote capture conditions are set and a predetermined remote capture request message is created (FIG. 34C), the controller 180 may generate a waiting-for-picture area in which a remotely captured image will be uploaded while posting the remote capture request message (FIG. 34D).

When the controller 180 receives a remote capture picture Pr from a remote terminal, the controller 180 may upload the remote capture picture Pr in the waiting-for-picture area included in a user interface provided through the SNS application.

An example of implementing the remote capture service during execution of the SNS application has been described through the fourth embodiment.

Figure 35:
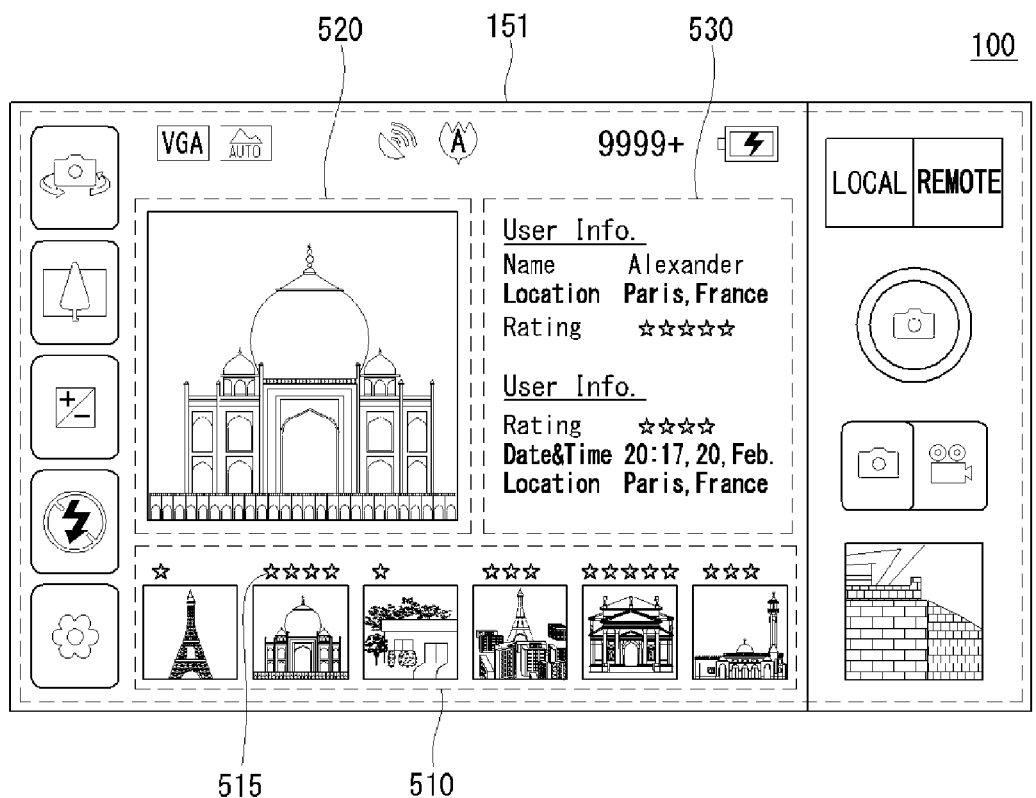
FIG. 35 shows an exemplary screen displaying an image remotely captured according to an embodiment of the present invention.

FIG. 35 shows an exemplary screen displaying a received remote capture picture according to the present embodiment of the invention.

The mobile terminal 100 may display one or remote capture images as one or more thumbnail images 510 on the touchscreen 151. When one of the thumbnail images 510 is selected, the controller 180 may enlarge the selected thumbnail image and display the enlarged image on the touchscreen 151.

In addition, the controller 180 may display user information 530 corresponding to the selected thumbnail image on the touchscreen 151.

For example, the user information 530 may include information about a user rating at which the remote capture requester adopts the remote capture picture corresponding to the selected thumbnail image after the user receives the remote capture request.

The user information 530 may include a picture rating 515 indicating evaluations of users who adopt the image captured by the corresponding user.

Accordingly, the remote capture requester can be provided with an objective image selection standard for selecting an image from the received remote capture pictures in response to the remote capture request.

The remote capture pictures and picture ratings about the users who have captured the pictures may be modified in various manners and displayed. For example, predetermined grading indicators (e.g. stars) 515 can be indicated at the tops of the thumbnail images, as shown in FIG. 35, to display picture ratings 515 for the remote capture pictures.

The method of controlling a mobile terminal according to the present embodiment of the invention can provide a predetermined point to a receiver by reflecting picture ratings of users in a remote capture picture taken by the receiver. For example, when a specific remote capture requester selects a remote capture picture, information about the selected remote capture picture can be transmitted to the server 200. The server 200 can provide a predetermined point to a user who has taken the remote capture picture selected by the specific remote capture requester.

The method of controlling a mobile terminal according to the present embodiment of the invention can provide an image other than a specific remote capture image, taken by a specific user, when user information about the specific user who has taken the specific remote capture image is selected.

A description will be given of an embodiment of receiving a remote capture request, performing remote capture and transmitting a remote capture image to a terminal that transmits the remote capture request. That is, an embodiment in which the mobile terminal 100 operates as a remote terminal will now be described with reference to FIGS. 36 to 38.

Figure 36:
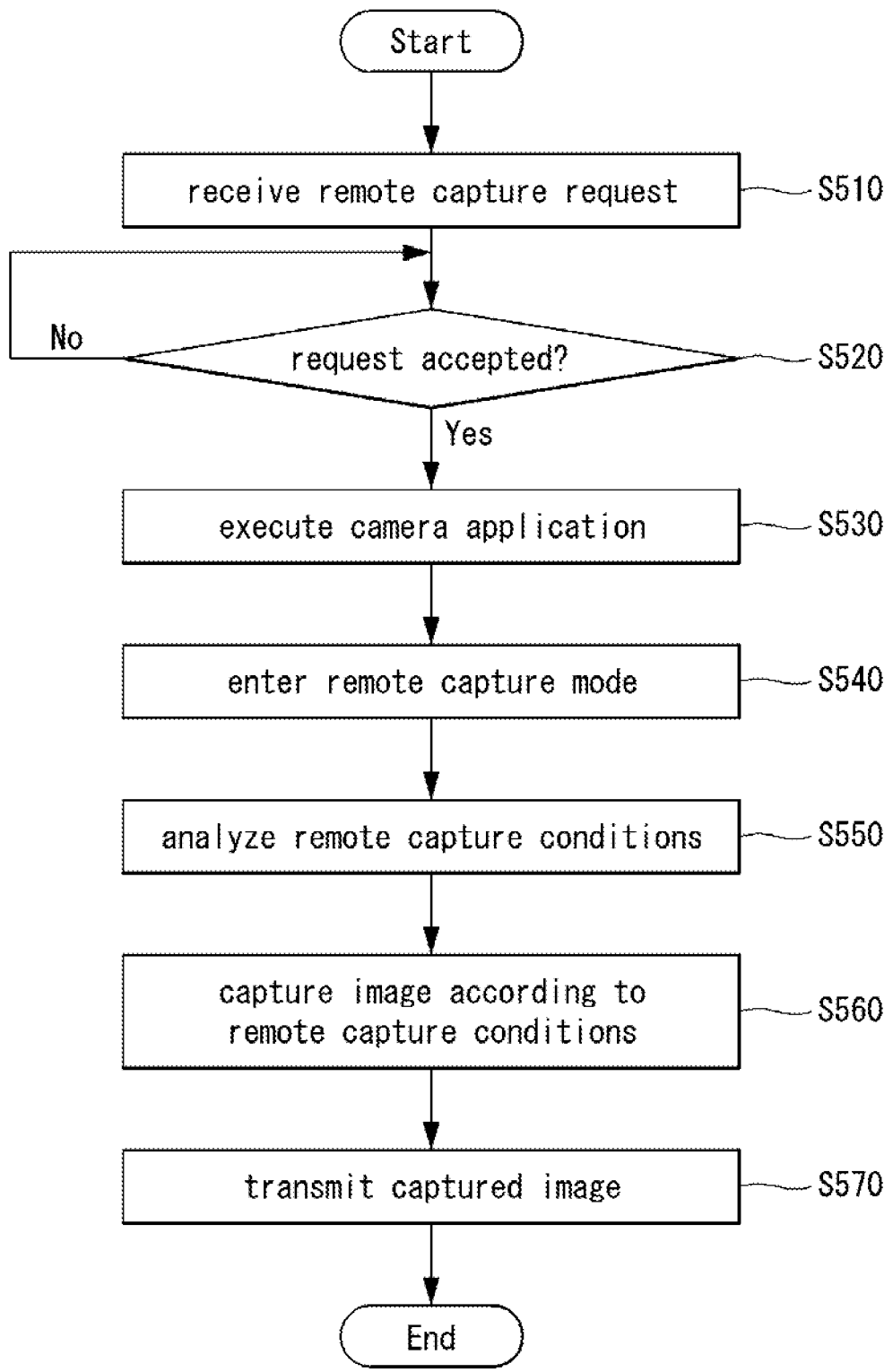
FIG. 36 is a flowchart illustrating a method of controlling a mobile terminal according to a fifth embodiment of the present invention.
Figure 37:
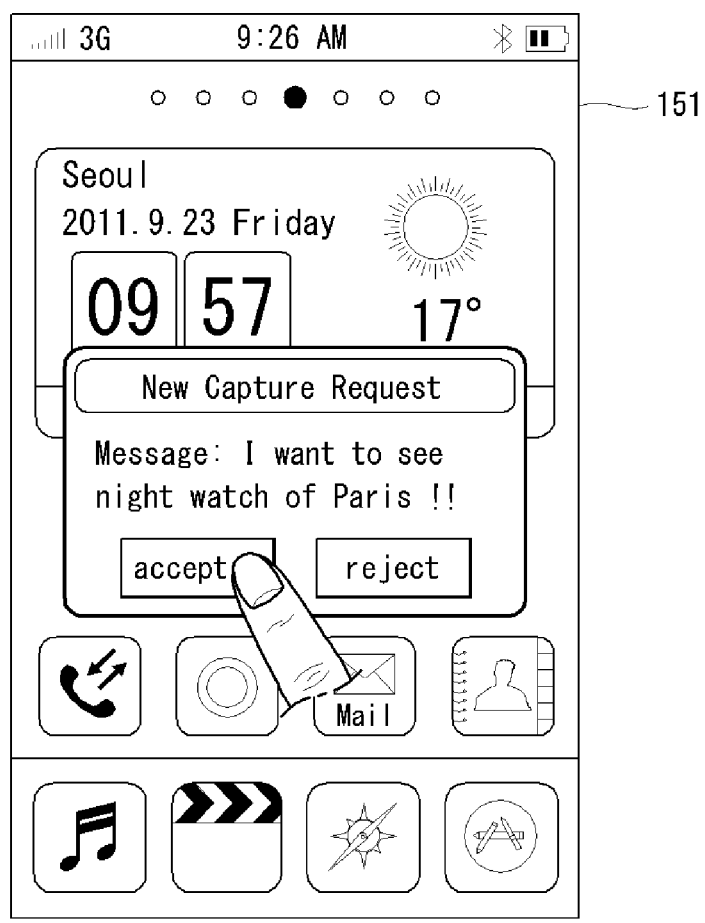
FIGS. 37 and 38 are diagrams for illustrating the method of controlling a mobile terminal according to the fifth embodiment of the invention.
Figure 38:
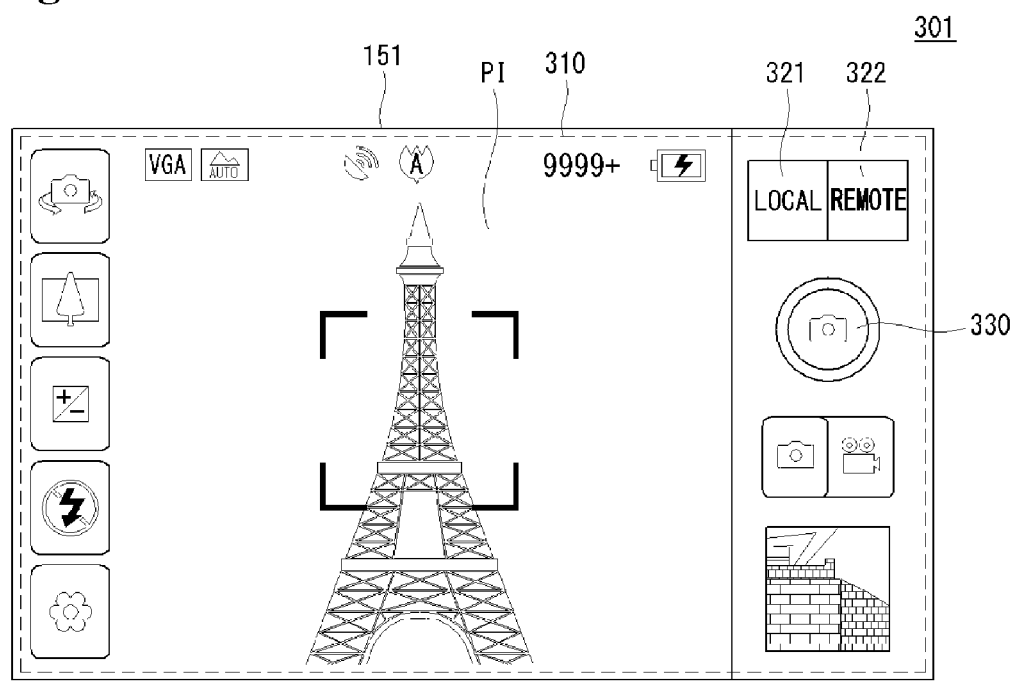

FIG. 36 is a flowchart illustrating a method of controlling a mobile terminal according to a fifth embodiment of the present invention and FIGS. 37 and 38 are diagrams for explaining the method of controlling a mobile terminal according to the fifth embodiment of the invention.

The method of controlling a mobile terminal according to the fifth embodiment of the invention may be implemented in the mobile terminal 100 described above with reference to FIG. 1. The method of controlling a mobile terminal according to the fifth embodiment of the invention and operations of the mobile terminal 100 to implement the method will now be described in detail with reference to related drawings.

It is assumed that the mobile terminal 100 is a remote terminal 301 for convenience of description.

Referring to FIG. 36, the remote terminal 301 may receive a remote capture request (S510). The remote terminal 301 may receive a remote capture request transmitted from the server 200.

The remote terminal 301 may determine whether to accept or reject the remote capture request (S520).

For example, referring to FIG. 37, the remote terminal 301 can receive a remote capture request message, display the remote capture request message on the display unit 151 and receive an input corresponding to acceptance or rejection of the remote capture request.

When the remote terminal 301 accepts the remote capture request (S520: YES), the remote terminal 301 may execute a camera application (S530) and the remote terminal 301 may enter the image capture mode by executing the camera application (S540).

Referring to FIG. 38, if the remote terminal 301 accepts the remote capture request, for example, the remote terminal 301 can automatically execute the camera application to enter the image capture mode.

The remote terminal 301 may analyze remote capture conditions included in the remote capture request signal (S550) and capture images according to the remote capture conditions (S560).

The remote terminal 301 may transmit a capture image to the mobile terminal 300 through the server 200 (S570).

Figure 39:
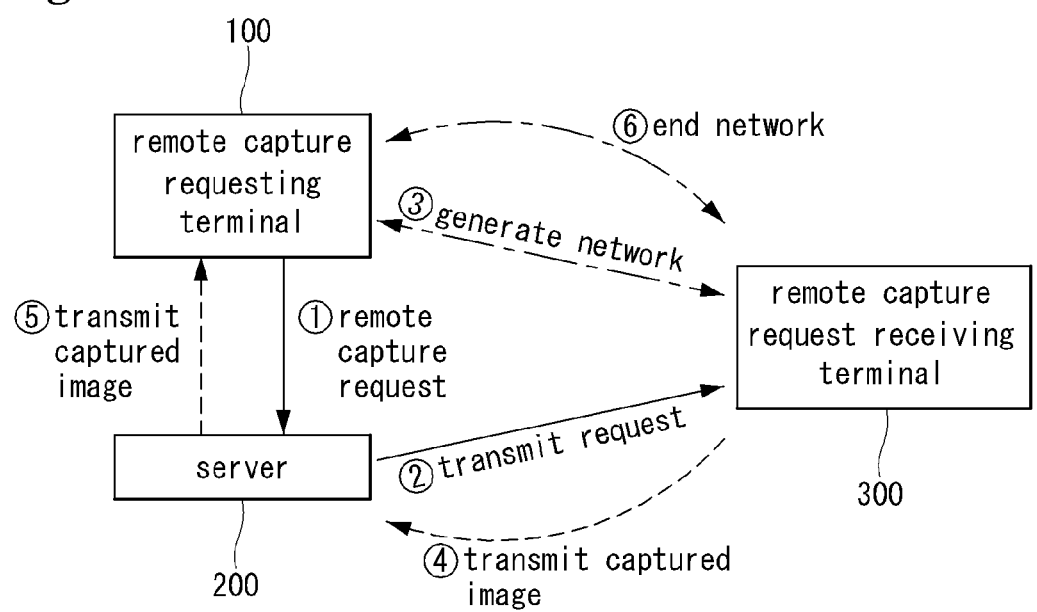
FIG. 39 illustrates network connection and ending procedures for implementing a remote photographing service according to an embodiment of the present invention.

FIG. 39 illustrates network connection and disconnection procedures for implementing the remote capture service according to an embodiment of the invention.

A method of controlling a mobile terminal according to an embodiment of the present invention may be performed through a data communication procedure among the remote capture requesting terminal 100 (referred to as a first mobile terminal hereinafter), the server 200 and a remote capture request receiving terminal 300 (referred to as a second mobile terminal hereinafter).

Referring to FIG. 39, the first mobile terminal 100 requests the remote capture service to the server 200. The server 200 transmits the remote capture request to the second mobile terminal 300.

When the second mobile terminal 300 accepts the remote capture request, the server 200 generates a network between the first mobile terminal 100 and the second mobile terminal 300.

The server 200 may transmit a capture image received from the second mobile terminal 300 to the first mobile terminal 100 and end the network connection.

The server 200 may generate different networks according to remote capture conditions received from the first mobile terminal 100 and end the networks when remote capture is finished.

The network connection and disconnection may be performed in real time, and thus a user can acquire an image of a place that the user does not visit in real time.

Operations of the mobile terminal 100 have been described through the first to fifth embodiments. However, the present invention is not limited thereto and can be modified in various manners.

For example, the mobile terminal 100 can capture a first image by executing the camera application, and then transmit the first image with a remote capture request signal when sending the remote capture request signal to a remote terminal. In this case, a remote capture requester can transmit a message that requests a second image remotely captured using the first image as a background.

The mobile terminal, server and method of controlling the same according to the embodiments of the present invention have the following advantages.

According to the present invention, it is possible to extend functions of various applications provided through the mobile terminal such that users located in different spaces can share a predetermined image through a network generated between the users in real time.

Furthermore, it is possible to easily acquire a desired image from a remote terminal that satisfies remote capture conditions by overcoming space restrictions.

The method for controlling of the mobile terminal according to embodiments of the present invention may be recorded in a computer-readable recording medium as a program to be executed in the computer and provided. Further, the method for controlling a mobile terminal according to embodiments of the present invention may be executed by software. When executed by software, the elements of the embodiments of the present invention are code segments executing a required operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM, a RAM, a CD-ROM, a DVD/ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of controlling a mobile terminal, the method comprising:
   setting at least one remote capture condition;
   transmitting a remote capture request that includes the at least one remote capture condition to a server, causing the server to search for at least one remote terminal that satisfies the at least one remote capture condition;
   displaying, via a display, a list of a plurality of remote terminals that satisfy the at least one remote capture condition according to a search result received from the server;
   displaying, via the display, profile information of users of remote terminals that accept the remote capture request among the plurality of remote terminals;
   displaying via the display, information about a remote terminal that is selected from the list;
   displaying a message creation screen for receiving a message to be transmitted to the selected remote terminal that accepted the remote capture request;
   transmitting the message to the selected remote terminal in real time via a network generated by the server between the mobile terminal and the selected remote terminal; and
   displaying, via the display, a plurality of remote images captured by the selected remote terminal, wherein the network is disconnected by the server when the plurality of remote images are received from the selected remote terminal,
   wherein:
   the information includes a user profile corresponding to the selected remote terminal;
   the information further includes a dynamic condition that is dynamically variable with time; and
   the dynamic condition includes current location information of the selected remote terminal.

2. The method of claim 1, wherein the at least one remote capture condition comprises information related to at least:
   a desired remote terminal for remote capture,
   user information related to the desired remote terminal,
   location information related to a user of the desired remote terminal,
   information related to a time at which the remote capture request is transmitted,
   information related to a time at which at least one image is requested to be received, or
   device information related to the desired remote terminal.

3. The method of claim 1, further comprising setting the at least one remote capture condition in response to a selection of one or more displayed remote capture conditions from a displayed menu.

4. The method of claim 1, further comprising:
   causing transmission of the remote capture request to the selected remote terminal in response to a selection input received via the list including the profile information.

5. The method of claim 1, further comprising:
   executing a specific application;
   displaying a user interface on the display upon execution of the specific application; and
   receiving an input via the user interface to request remote capture.

6. The method of claim 5, wherein:
   the specific application comprises a camera application; and
   the user interface comprises an interface for capturing at least one image with a camera.

7. The method of claim 6, wherein the user interface further comprises:
   a first region for selecting an image capture mode or a remote capture mode; and
   a second region for transmitting the remote capture request.

8. The method of claim 5, wherein the specific application comprises a social network service (SNS) application, the method further comprising:
   executing the SNS application;
   requesting remote capture during execution of the SNS application; and
   setting the at least one remote capture condition upon execution of the SNS application to include SNS information displayed in the SNS application.

9. The method of claim 5, wherein the specific application comprises a map application, the method further comprising:
   displaying a map on the display;
   acquiring location information corresponding to a selected specific point on the displayed map in response to an input selecting the selected specific point; and
   setting the at least one remote capture condition to include the acquired location information.

10. The method of claim 1, further comprising:
    transmitting a remote control request to the selected remote terminal;
    receiving a signal indicating acceptance of the remote control request from the selected remote terminal;
    displaying a preview screen on the display, the preview screen comprising a preview image captured by the selected remote terminal; and
    displaying a control area on the display for controlling image capture functions of the selected remote terminal.

11. The method of claim 1, further comprising:
    displaying a control area on the display for controlling image capture functions of the selected remote terminal; and
    transmitting a remote capture command to the selected remote terminal in response to a capture input;
    wherein the remote capture command comprises instructions to the selected remote terminal to capture at least one of the plurality of remote images.

12. The method of claim 1, wherein the server does not configure a network between the mobile terminal and remote terminals among the plurality of searched remote terminals that do not accept the remote capture request, or the server disconnects a network previously established between the mobile terminal and the remote terminals among the plurality of searched remote terminals that do not accept the remote capture request.

13. A method for controlling a server, the method comprising:
- receiving a remote capture request including at least one remote capture condition from a mobile terminal;
- determining a plurality of remote terminals capable of capturing an image according to the at least one remote capture condition;
- searching for at least one remote terminal that satisfies the at least one remote capture condition among the plurality of remote terminals;
- transmitting a search result to the mobile terminal, causing display, at the mobile terminal, of a list of a plurality of remote terminals that satisfy the at least one remote capture condition according to the search result and profile information of users of remote terminals that accept the remote capture request among the plurality of remote terminals;
- receiving a selection signal from the mobile terminal indicating a selected one of the plurality of remote terminals;
- transmitting a message generated at the mobile terminal to the selected one of the plurality of remote terminals via a network generated by the server between the mobile terminal and the one of the plurality of remote terminals when the one of the plurality of remote terminals is selected at the mobile terminal from the list and when the message addressed to the selected one of the plurality of remote terminals is received by the server;
- receiving at least one image captured by the selected one of the plurality of remote terminals according to the at least one remote capture condition;
- transmitting the at least one image to the mobile terminal, causing display of the at least one image at the mobile terminal; and
- disconnecting the network when the at least one image is received by the mobile terminal,
- wherein:
  - the information includes a user profile corresponding to the selected one of the plurality of remote terminals;
  - the information further includes a dynamic condition that is dynamically variable with time; and
  - the dynamic condition includes current location information of the selected one of the plurality of remote terminals.

14. A mobile terminal comprising:
- a communication unit configured to transmit or receive information;
- a display configured to display information; and
- a controller configured to:
  - set at least one remote capture condition;
  - cause the communication unit to transmit a remote capture control request including the at least one remote capture condition to a server, causing the server to search for at least one remote terminal that satisfies the at least one remote capture condition;
  - cause the display to display a list of a plurality of remote terminals that satisfy the at least one remote capture condition according to a search result received from the server;
  - cause the display to display profile information of users of remote terminals that accept the remote capture request among the plurality of remote terminals;
  - cause the display to display information about a remote terminal that is selected from the list;
  - cause the display to display a message creation screen for receiving a message to be transmitted to the selected remote terminal that accepted the remote capture request;
  - cause the communication unit to transmit the message to the selected remote terminal in real time via a network generated by the server between the mobile terminal and the selected remote terminal; and
  - cause the display to display a plurality of remote images captured by the selected remote terminal, wherein the network is disconnected by the server when the plurality of remote images are received from the selected remote terminal,
  - wherein:
    - the information includes a user profile corresponding to the selected remote terminal;
    - the information further includes a dynamic condition that is dynamically variable with time; and
    - the dynamic condition includes current location information of the selected remote terminal.

15. The mobile terminal of claim 14, wherein the at least one remote capture condition comprises at least information related to:
- a desired remote terminal for remote capture,
- user information related to the desired remote terminal,
- location information related to a user of the desired remote terminal,
- information related to a time at which the remote capture request is transmitted,
- information related to a time at which at least one image is requested to be received, or
- device information related to the desired remote terminal.

16. The mobile terminal of claim 14, wherein the controller is further configured to:
- execute a specific application;
- cause the display to display a user interface upon execution of the specific application; and
- changing the mobile terminal to a remote capture mode in response to an input via the user interface.

17. The mobile terminal of claim 16, wherein:
- the executed application comprises a camera application; and
- the controller is further configured to cause the display to display a user interface for capturing at least one image with a camera.

18. The mobile terminal of claim 16, wherein:
- the executed application comprises a social network service (SNS) application; and
- the controller is further configured to:
  - set the at least one remote capture condition upon execution of the SNS application to include SNS application information displayed in the SNS application.

19. The mobile terminal of claim 16, wherein:
- the executed application comprises a map application; and
- the controller is further configured to:
  - cause the display to display a map;
  - acquire location information corresponding to a selected specific point on the displayed map in response to an input selecting the selected specific point; and
  - set the at least one remote capture condition to include the acquired location information.

20. The mobile terminal of claim 14, wherein the controller is further configured to:

cause the display to display a control area for controlling image capture functions of the selected remote terminal; and cause the communication unit to transmit a remote capture command to the selected remote terminal in response to a capture input, wherein the remote capture command comprises instructions to the selected remote terminal to capture at least one of the plurality of remote images.

* * * * *